(12) United States Patent
Ishimi et al.

(10) Patent No.: US 7,069,252 B2
(45) Date of Patent: Jun. 27, 2006

(54) ELECTRONIC TRANSACTION SERVER, CLIENT FOR SELLER, CLIENT FOR BUYER AND ELECTRONIC TRANSACTION METHOD

(75) Inventors: Munehiko Ishimi, Kawasaki (JP); Hirofumi Fujiwara, Kawasaki (JP); Kazuhiko Sekine, Kawasaki (JP); Toshihiko Kaji, Kawasaki (JP); Toshiyuki Iida, Tokyo (JP); Yoshihide Tanaka, Tokyo (JP); Keiko Shiraishi, Tokyo (JP); Akimitsu Yomoda, Tokyo (JP); Seinosuke Kashima, Kawasaki (JP)

(73) Assignees: Fujitsu Limited, Kawasaki (JP); Mitsubishi Corporation, Tokyo (JP); NTT Communications Corporation, Tokyo (JP); Sumitomo Corporation, Tokyo (JP); Information-Technology Promotion Agency, Tokyo (JP)

( * ) Notice: Subject to any disclaimer, the term of this patent is extended or adjusted under 35 U.S.C. 154(b) by 0 days.

(21) Appl. No.: 10/337,419

(22) Filed: Jan. 7, 2003

(65) Prior Publication Data
US 2003/0140011 A1    Jul. 24, 2003

Related U.S. Application Data

(63) Continuation of application No. PCT/JP01/05846, filed on Jul. 5, 2001.

(30) Foreign Application Priority Data
Jul. 7, 2000 (JP) .............................. 2000-207133

(51) Int. Cl.
*G06F 17/60* (2006.01)

(52) U.S. Cl. .......................... 705/76; 705/28; 705/29; 705/35; 705/39; 710/10; 435/309

(58) Field of Classification Search .................. 705/76, 705/35; 710/10
See application file for complete search history.

(56) References Cited

U.S. PATENT DOCUMENTS 5,717,989 A    2/1998    Tozzoli et al.

(Continued)

FOREIGN PATENT DOCUMENTS

EP    0409838 B1 *    8/1994

(Continued)

OTHER PUBLICATIONS

Cottrill, Ken, Air industry moves closer to its customers with electronic links, Global Trade & Transportation. Philadelphia: Apr. 1994, vol. 114, Iss 4 p. 30.*

(Continued)

*Primary Examiner*—Firmin Backer
(74) *Attorney, Agent, or Firm*—Staas & Halsey LLP

(57) ABSTRACT

A user registration processor unit registers the user registration information to the database, which includes the public key certification acquired from the certification authority that has jurisdiction over each party by the request from the transaction party including seller, buyer, and transportation company. A transfer registration processor unit changes the access right holder and the cargo owner of the shipment information registered to the database at the start of transaction in compliance with the request for request for changing registration of the party with the digital signature and public key certification attached. A verification processor unit achieves the transfer registration with legal binding power by verifying that the digital signature attached to the request for request for changing registration has been prepared by the private key which makes a pair with the public key certificate registered to the database and receiving the approval of the other party.

21 Claims, 28 Drawing Sheets

U.S. PATENT DOCUMENTS

| | | | |
|---|---|---|---|
| 5,745,574 A | | 4/1998 | Muftic |
| 6,151,588 A | * | 11/2000 | Tozzoli et al. ............... 705/37 |
| 2003/0163431 A1 | * | 8/2003 | Ginter et al. ............... 705/64 |
| 2004/0177028 A1 | * | 9/2004 | Francis et al. ............... 705/37 |

FOREIGN PATENT DOCUMENTS

| | | |
|---|---|---|
| JP | 11-175591 | 10/1999 |
| WO | WO 99/47100 | 8/1999 |

OTHER PUBLICATIONS

"Cross Border Torihiki ni okeru Kinyuu EDI ni kansuru Kenkyuukai (Part 2) Houkokusho (No. 1)", Kinyuu Joho System, Jun., 1, 1999 No. 216, pp. 86 to 138.

"Cross Border Torihiki ni okeru Kinyuu EDI ni kansuru Kenkyuukai (Part 2) Houkokusho (No. 2)", Kinyuu Joho System, Jul., 1, 1999, No. 217, pp. 130 to 174.

"Beikoku ni okeru EDI, Denshi Shoutorihiki ni kansuru Houkoku", Kinyuu Joho System, Aug., 1, 1999, No. 218, pp. 66 to 81.

International Search Report for Application No. PCT/JP01/05846 dated Oct. 9, 2001.

Josang, A. et al., "PKI Seeks a Trusting Relationship", Information Security and Privacy, Australasian Conference, ACISP, Jun. 12, 2000, pp. 1-14.

Search Report for corresponding European Application No. 01947852.8.

* cited by examiner

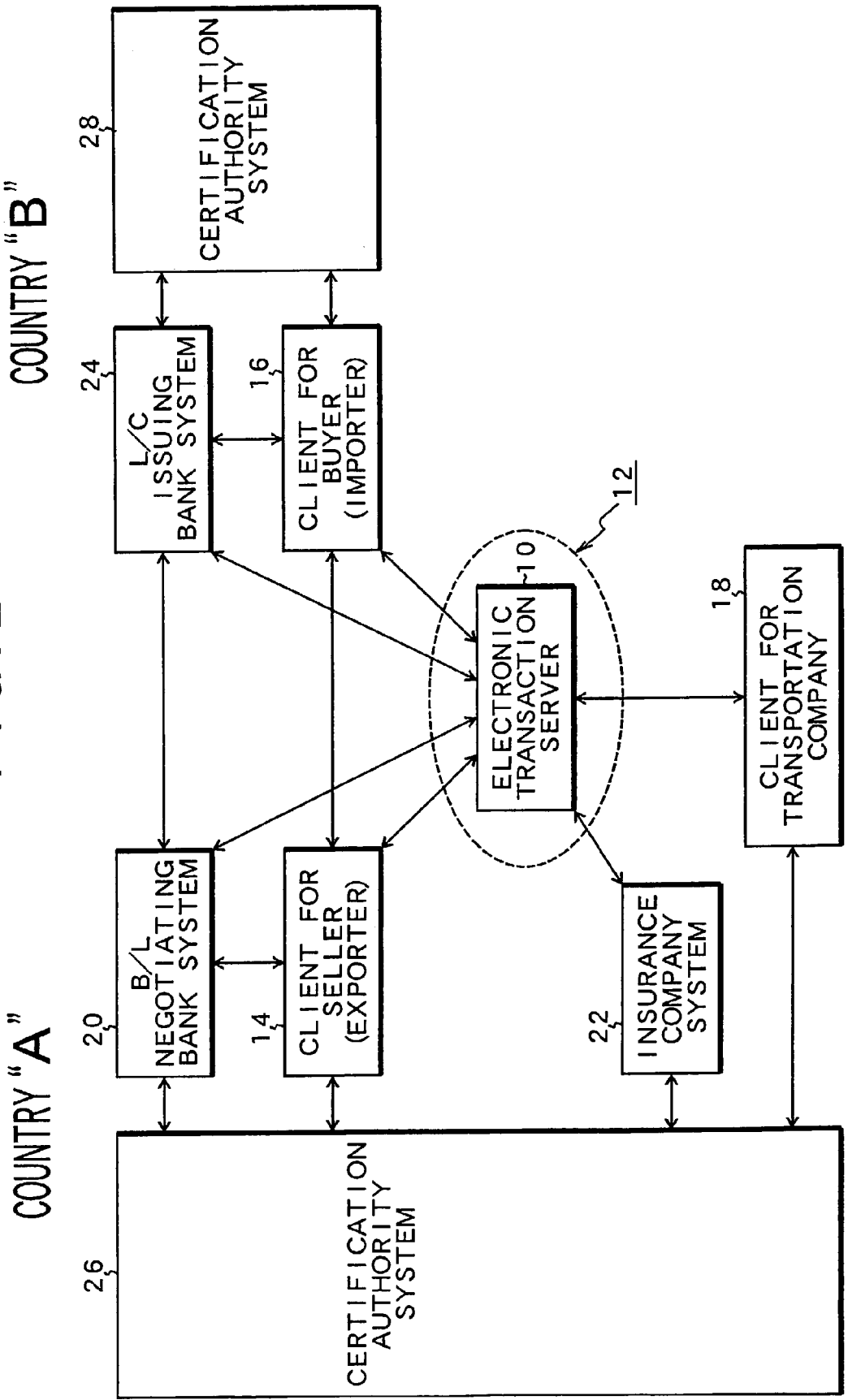

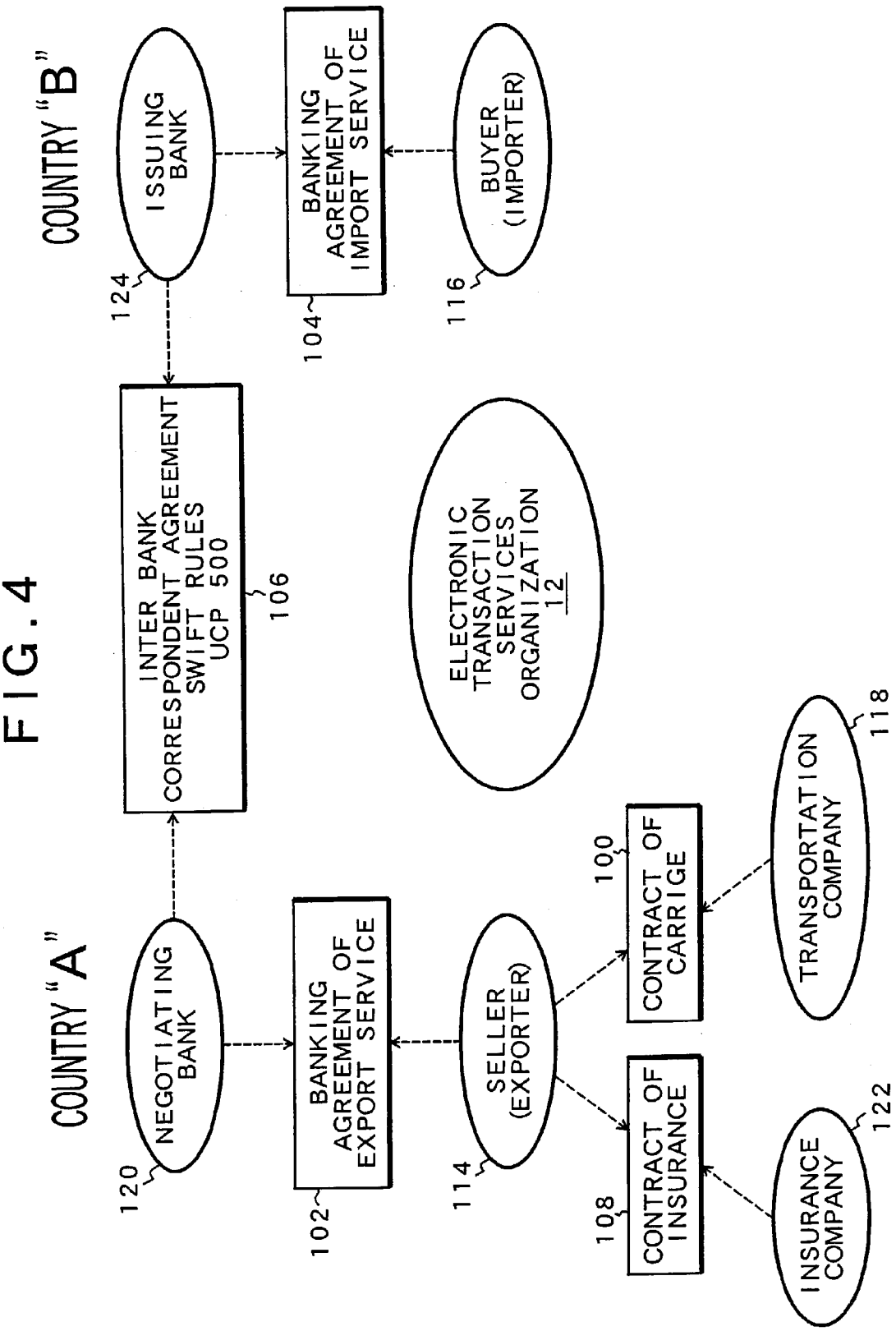

FIG. 13

| 74 | 75 | 76 | 78 | 80 | 82 |
|---|---|---|---|---|---|
| SENDER ID | SHIPMENT INFORMATION ID | INSTRUCTION TO SERVICES ORGANIZATION | SUBSEQUENT HOLDER OF RIGHTS ID | SHIPMENT INFORMATION | DIGITAL SIGNATURE |

| # | Field | Group |
|---|---|---|
| 86 | SHIPMENT INFORMATION ID | 84 |
| 88 | HASH VALUE OF SHIPMENT INFORMATION | 84 |
| 90 | DATE AND TIME OF SHIPMENT INFORMATION REGISTRATION | 84 |
| 92 | SHIPMENT INFORMATION | 84 |
| 94 | ACCESS RIGHT HOLDER INFORMATION (X) | 85 |
| 95 | CARGO OWNER INFORMATION (X) | 85 |
| 96 | INFORMATION ON RIGHTS APPENDANT TO CARGO | 85 |
| 98 | DATE AND TIME OF ALTERED SHIPMENT INFORMATION REGISTRATION | 85 |

- 86 — SHIPMENT INFORMATION ID
- 88 — HASH VALUE OF SHIPMENT INFORMATION
- 90 — DATE AND TIME OF SHIPMENT INFORMATION REGISTRATION
- 92 — SHIPMENT INFORMATION
- 94 — ACCESS RIGHT HOLDER INFORMATION (X)
- 95 — CARGO OWNER INFORMATION (X)
- 96 — INFORMATION ON RIGHTS APPENDANT TO CARGO
- 98 — DATE AND TIME OF ALTERED SHIPMENT INFORMATION REGISTRATION
- 94-1 — ACCESS RIGHT HOLDER INFORMATION (Y)
- 95-1 — CARGO OWNER INFORMATION (Y)
- 96-1 — INFORMATION ON RIGHTS APPENDANT TO CARGO
- 98-1 — DATE AND TIME OF ALTERED SHIPMENT INFORMATION REGISTRATION

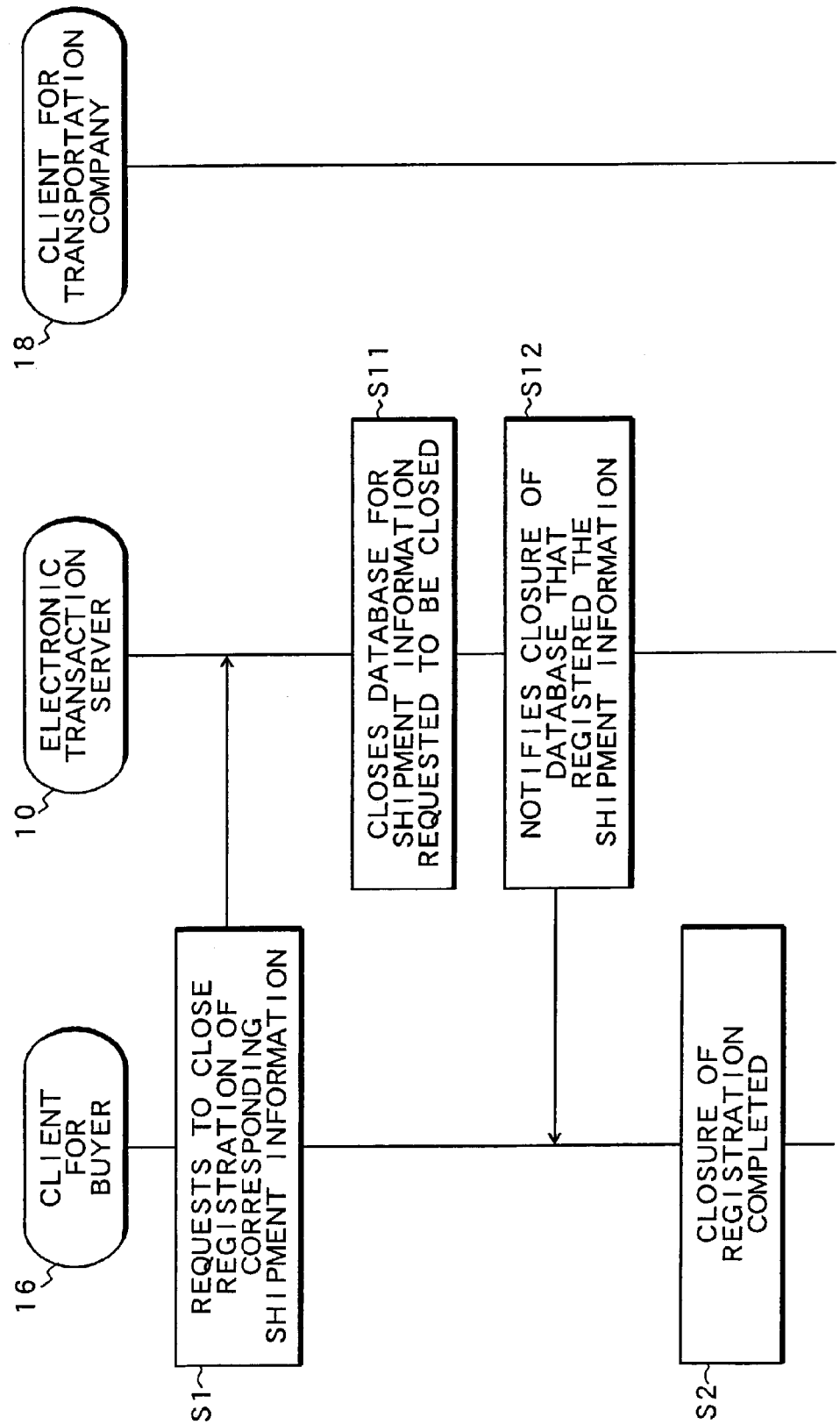

ELECTRONIC TRANSACTION SERVER, CLIENT FOR SELLER, CLIENT FOR BUYER AND ELECTRONIC TRANSACTION METHOD

This application is a continuing application, filed under 35 U.S.C. §111(a), of International Application PCT/JP01/05846, filed 5 Jul. 2001, it being further noted that foreign priority benefit is based upon Japanese Patent Application 2000-207133, filed 7 July 2000.

TECHNICAL FIELD

The present invention relates to an electronic transaction server, client for seller, client for buyer, and electronic transaction method for realizing a business model that computerizes transaction procedures, and in particular, to the electronic transaction server, client for seller, client for buyer, and electronic transaction method that electronically disposes of safe international trading transactions using he public key certification issued by different certification authorities.

BACKGROUND ART

In recent years, electronic commerce (EC) has been rapidly gaining popularity and in some regions, the "electronic signature law" has come into existence in order to generate the legal binding force to the electronic commerce. In the present foreign trade procedures, the bill of lading issued by a shipping company is handled as securities to which the subject cargo is transformed, and the owner of the bill of lading has the right to finally receive the cargo from the shipping company at the importing country side.

In this way, in the present laws and treaties, the bill of lading is premised to be prepared in writing, and the computerized documents of the bill of lading are unable to have legal protection as the bill of lading. As a method for computerizing these foreign trade procedures and bringing them under the legal protection, a method for binding all the people related to trading with one rule. By this method, participants must have the public key certificate issued by the same certification authority (CA). In general, the certification authority issues the certificate of the public key corresponding to the private key which an individual, a company, etc. only possesses, and controls the effectiveness or ineffectiveness of the certificate. When the electronic signature utilizing the public key certificate is used for actual transaction, the certification authority must confirm that the subject really exists. To confirm the real existence of the subject, the certification authority which is geographically located near the subject and can actually confirm the real existence of the subject is advantageous, and it is difficult for one certification authority to certify the subject that extends internationally. In addition, the competent court should any problems occur is restricted to one place. Furthermore, there is a problem in that there is no standard competitive environment for carrying out electronic foreign trade procedures.

As one of the concepts for solving these problems, there is a concept of Route CA. The route CA is a scheme to certify other certification authority with a specific certification authority serving as a route. However, there is no international rule which has been standardly agreed on the electronic signature, and we are still in the state in which the framework for electronically carrying out all the trade transactions that have a special side called electronic commerce extending internationally has not yet been prepared.

DISCLOSURE OF INVENTION

Accordingly, it is an objective of the present invention to provide an electronic transaction server, client for seller, client for buyer, and electronic transaction method for computerizing the cargo ownership without computerizing the bill of lading, transferring this cargo ownership together with legal effects, and building up a business model of an electronic transaction that achieves effectiveness in transaction procedures.

It is another object of the present invention to provide an electronic transaction server, client for seller, client for buyer, and electronic transaction method for building up a business mode for electronic transaction which realizes the international safe trade transaction by making the best of the electronic network with the existing legal mechanism set on the base where legal reorganization concerning electronic signature is still incomplete.

The essential points of the business model of the electronic transaction to be built up by the present invention are following three:

(1) The electronic transaction is carried out by the separability-type agreement.
(2) In the verification of the electronic signature, prior exchange of public key certification and user registration information are used.
(3) The bill of lading or electronic bill of lading which is a computerized bill of lading is not used but in pursuant to the legal scheme of passage of title by instructions, the title to the cargo is computerized and passed.

These three essential points are described further in detail as follows.

(Separability Type Agreement)

In order to practice the electronic transaction procedures with legal binding force, the following three agreement relations shall be concluded in addition to previous working-level agreements.

(1) Certification Authority Agreement (CA agreement):

An agreement related to the issuance of public key certificate necessary for verification of electronic signature and the use thereof, and to be concluded between transaction parties (exporter, importer, bank, insurance company, transportation company, etc.) and the certification authority, respectively.

(2) Electronic Transaction Services Organization Agreement:

An agreement related to the services for registering the shipment information, cargo title information, etc. concerning the specific cargo, which is the subject of transaction, and controlling the transfer, and to be concluded between the transaction parties and electronic transaction services organization, respectively. The electronic transaction services organization also functions as a repository service provider RSP, and this agreement is also called the RSP agreement.

(3) Data Interchange Agreement (IA Agreement: Interchange Agreement):

This is an agreement that will cause legal binding force when the transaction which has been carried out by documents called the bill of lading is carried out by the electronic transaction procedure (passage of title to the cargo) with the public key certification provided by the two services based on the certification authority agreement and electronic transaction services organization agreement as well as registration of the title to the cargo to the database, and that will be executed between transaction parties themselves with direct transaction relations.

(Certification of Electronic Signature)

The following four systems will be introduced.

(1) When the data interchange agreement is concluded, the public key certificates issued by optional certification authorities chosen by users are interrequest for changing registration. When the public key certificates are not interrequest for changing registration at the time of concluding the agreement, the procedures for safely interchanging the certificates later shall be provided and the certificates shall be interrequest for changing registration later.

(2) When the electronic signature is verified by the use of the public key certificate interrequest for changing registration in the data interchange agreement, both parties to the agreement shall agree that effects jurisdiction that will legally bind the registered parties of the electronic signature key is generated with respect to the transmission contents, and the preparation of the transmitted contents are assumed to be signed by the parties registered to the public key certificate.

(3) In order to prevent legal binding force from being generated by the verification of the public key certificate due to loss, peril, etc. of the signature key, the party shall notify the electronic transaction services authority and bring the public key certificate registered to the user registration database to the non-registered condition.

(4) It shall be agreed that effects jurisdiction or presumptive effects should be prevented from being functioned in the data interchange agreement, if the public key certificate is in the non-registered state when the electronic signature is verified.

By incorporating these systems, the transaction parties can acquire the public key certificate using the certification authority of each country which is close to them and readily available and can utilize for the electronic signature of the electronic transaction.

(Passage of Title to the Cargo by Instruction)

The present invention is characterized by electronically achieving the passage of title by the present right holder to the title to the cargo to give instructions to the possessor of the cargo (transportation company) without utilizing the electronic bill of lading. However, since the current transportation company is not prepared with the electronic service mechanism to receive instructions to pass the title to the cargo and control the title, the present invention establishes the electronic transaction service organization (repository service provider RSP) and pas the title to the cargo registered to the database in compliance with the instructions of the right holder to the cargo. In order for the electronic transaction service organization to carry out the procedures of the transportation company, the electronic transaction services organization must acquire both passive power of representation and active power of representation in advance from the transportation company through executing an agreement. The passive power of representation is the right for the transportation company to receive instructions for transfer from the right holder of the cargo. The active power of representation is the right to have confirmation of the passing party and give an approval with respect to the instructions for transfer received from the right holder of the cargo.

In the present invention, for the title to the cargo, three tittles, namely, "title to possess," "title to own, " and "other titles," are assumed. The right to possess is defined as the access right. This access right is not only the right to possess the cargo but also the right to change the registration to the database of the present invention. The person who has the access right is called the access right holder and when the access right holder is request for changing registration, the possessor (the person who possesses the cargo indirectly) is also request for changing registration. The deed to deliver the bill of lading in the conventional transaction is substituted by changing the access right in the electronic transaction according to the present invention. Since the person who possesses the cargo is not always the owner of the cargo, in the present invention, a data item called the owner is provided for the title to own the cargo. Furthermore, other titles mean the titles appendant to cargo such as pledge, mortgage, etc. to the cargo.

In order to achieve the business model of electronic transaction in accordance with the mechanism as described above, the present invention provides an electronic transaction server, client for seller, client for buyer, and electronic transaction method.

The present invention is to provide the electronic transaction server to the electronic transaction services organization, which is the central core of this system, and this electronic transaction server comprises a user registration processor unit, transfer registration processor unit 34, and verification processor unit. The user registration processor unit registers the user registration information to the database, which includes the public key certification acquired from the certification authority that has jurisdiction over each party by the request from the transaction party including seller, buyer, and transportation company (shipping company, airline company, truck company, railway company, and other transportation companies). The transfer registration processor unit changes the access right holder and the cargo owner of the shipment information 42 registered to the database at the start of transaction in compliance with the request for request for changing registration of the party with the digital signature and public key certification attached. The verification processor unit achieves the transfer registration with legal binding power by verifying that the digital signature attached to the request for request for changing registration has been prepared by the private key which makes a pair with the public key certificate registered to the database and receiving the approval of the other party. As described above, according to the present invention, as far as the parties utilizing the public key certificates in their actual transaction by this kind of electronic transaction server register their own public key certificate in the database of the electronic transaction services organization with security secured and the public key certificate is registered, the electronic signature can be verified, and as a result, electronic transaction can be safely carried out without premising the existence of Route CA and using the public key certificate whichever certificate organization issues.

Now, the transfer registration processor unit initially registers the shipment information with the cargo owner designated as the seller to the database in accordance with the initial registration request from the client for transportation company with the digital signature and the public key certificate attached. Then, the title to the cargo is request for changing registration to the buyer in accordance with the request for changing registration from the client for seller with the digital signature and public key certificate attached. Lastly, the registration of shipment information is closed in accordance with the closure request from the client for buyer with the digital signature and the public key certificate attached and the change of the cargo owner is prohibited. In this case, the verification processor unit 36 verifies that the digital signature attached to each request has been prepared by the private key that makes a pair with the public key certificate registered to the database 38, and acquires the approval of the other party simultaneously, thereby achieving the transfer registration with legal binding force. The user registration processor unit prepares the user registration information including the user ID of the transaction party, date of user registration, registration expiry date, public key certificate, and user information and registers to the database. The user registration processor unit establishes and registers the invalidation information on the public key certificate to the user registration information on request from the transaction party, changes the closure-registration state, and prevents achievement of the transfer registration with legal binding force by the verification processor unit.

The shipment information registered to the electronic transaction server comprises the fixed information and updated information; the fixed information contains the shipment information ID, shipment information hash value, shipment information registration date and time, and shipment information, while the updated information contains the access right holder information, cargo owner information, information on rights appendant to cargo, and date and time of altered shipment information registration. The request message from the transaction party has a message structure containing the transmitter ID, shipment information ID, instructions to the server, next right holder ID, shipment information, and digital signature. The user registration processor unit of the electronic transaction server further registers the user registration data of the intermediate parties such as banks, etc. which stand between the seller and the buyer. In the actual transaction, a plurality of intermediate trades such as banks, etc. stand between the seller, the exporter, and the buyer, the importer. Consequently, the transfer registration processor unit initially register the shipment information in accordance with the initial registration request with the digital signature and the public key certificate attached from the client for transportation company, changes the access right holder and the cargo owner to the intermediate party in compliance with the request for changing registration with the digital signature and public key certificate attached from the client for seller, and then, changes the access right holder and the cargo owner to other intermediate party or buyer in compliance with the request for changing registration with the digital signature and the public key certificate attached from the intermediate party, and lastly, closes the registration of shipment information and prohibits change of the title to the cargo in compliance with the closure request with the digital signature and the public key certificate attached from the client for buyer. In such event, the verification processor unit verifies that the digital signature attached to the request has been prepared by the private key that makes a pair with the public key certificate registered to the database and acquires an approval of the other party, thereby establishing the transfer registration that has the legal binding force. The bank that serves as an intermediate party in the electronic transaction is, for example, a negotiating bank who has a banking agreement of export service with the seller, and/or an issuing bank who has a banking agreement of import service with the buyer. The transfer registration processor unit of the electronic transaction server notifies the client for transportation company of closure of the database registration of shipment information and instructs to deliver the cargo to the present cargo owner when the registration of shipment information is closed and changes of the cargo owner are prohibited.

The present invention presents the client for transportation company used for the business model of the electronic transaction. The client for transportation company comprises a user registration request unit for requesting the data registration of user registration information including the public key certificate acquired from the certificate authority that has jurisdiction over itself to the server, an initial registration request unit for transmitting the initial registration request to the electronic transaction server with the digital signature and public key certificate attached to the shipment information and initially registering the shipment information to the database, and a cargo delivery processor unit 54 for carrying out necessary procedures for delivering cargo to the present cargo owner.

The present invention presents a client for seller used for building up a business model of electronic transaction. The client for seller comprises a user registration request unit for requesting the database registration of the user registration information including the public key certificate acquired from the certificate authority that has jurisdiction over itself to the server, an initial registration check request unit for checking the contents and responding the results when the request for checking the initial registration request of the shipment information is received from the server, and a transfer request unit for transmitting to the server the request for changing registration for changing the access right holder and cargo owner to buyer with the digital signature and the public key certificate attached, receiving the request for changing registration notice from the server, and recognizing the establishment of transfer registration with legal binding force.

Further, the present invention presents a client for buyer used for building up a business model for electronic transaction. The client for buyer comprises a user registration request unit for requesting the database registration of user registration information including the public key certificate acquired from the certificate authority that has jurisdiction over itself to the server, a transfer check unit for checking the contents and responding the results when the check request is received from the server for requesting the request for changing registration to change the access right holder and the cargo owner to the buyer, a registration closure request unit for transmitting to the server the closure request of shipment information of the database with the digital signature and public key certificate attached and carrying out necessary procedures for receiving the cargo delivered by the transportation company when the registration closure notice is received from the server.

The present invention intends to provide an electronic transaction method, comprising a procedure for registering the user registration information including the public key certificate acquired from the certificate authority that has jurisdiction over each party to the server on the request of the transaction parties including the seller, buyer, and transportation company;

a procedure for changing the access right holder and cargo owner registered to the database at the start of transaction to other party in compliance with the request for changing registration of the party with the digital signature and public key certificate attached; and a procedure for achieving the transfer registration with legal binding force by verifying that the digital signature attached to each request has been prepared by the private key that makes a pair with the public key certificate registered to the database, and acquiring the approval of the other party simultaneously. The details of this electronic transaction method is basically same as those of the electronic transaction server.

Furthermore, the present invention intends to provide a computer-readable memory medium that stores the electronic transaction program, and the electronic transaction program comprises a user registration step for registering the user registration information including the public key certificate acquired from the certificate authority that has jurisdiction over each party to the database on the request of the transaction parties including the seller, buyer, and transportation company;

a request for changing registration step for changing the access right holder and cargo owner registered to the database at the start of transaction to other party in compliance with the request for changing registration of the party with the digital signature and public key certificate attached; and a verification step for achieving the transfer registration with legal binding force by verifying that the digital signature attached to each request has been prepared by the private key that makes a pair with the public key certificate registered to the database, and acquiring the approval of the other party simultaneously. The details of this electronic transaction method is basically same as those of the electronic transaction server.

The above and other objects, features, and advantages of the present invention will become more apparent from the following detailed description with reference to the drawings.

BRIEF DESCRIPTION OF DRAWINGS

FIG. 2 is an illustration of the data transmission form in FIG. 1;

FIG. 4 is an illustration of existing business practice agreement which is the premise of the electronic transaction of the present invention;

FIG. 13 is an illustration of the construction of a communication message sent from the client side of FIG. 3 to the server;

FIG. 14 is an illustration of shipment information registered to the database of FIG. 3:

FIG. 17 is an illustration of shipment information updated by title transfer registration processing of FIG. 16;

FIG. 19 is a time chart of title transfer completing processing of FIG. 11;

BEST MODE FOR CARRYING OUT THE INVENTION

Figure 1:
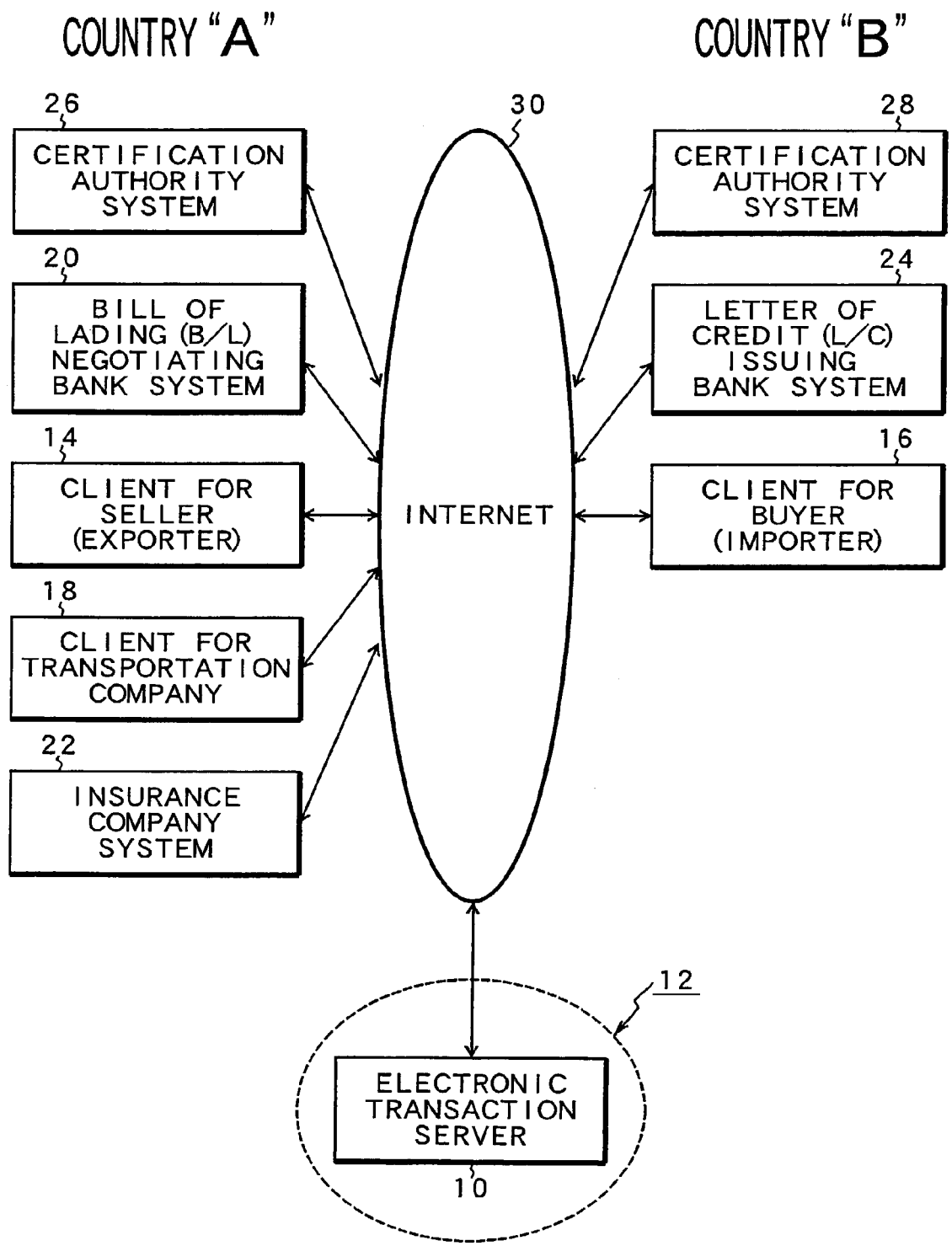
FIG. 1 is an illustration showing the electronic transaction system to be built up by the present invention.

FIG. 1 is an illustration showing the electronic transaction system to be built up by the present invention. For organizations that serve as central cores of the electronic transaction according to the present invention, an electronic transaction services organization 12 that functions as repository service provider RSP is installed, and to the electronic transaction service organization 12, an electronic transaction server 10 is installed. For this electronic transaction server 10, seller (exporter), buyer (importer), transportation company (shipping company, airline company, truck company, railway company, etc.), who are parties that participate in the electronic transaction services, bank, insurance company, and other parties to the transaction are connected by various clients or systems via Internet 30.

That is, as the user side for the electronic transaction server 10, client 14 for seller, client 16 for buyer, and client 18 for transportation company are installed, and these three clients compose basic transaction parties. Furthermore, since in actual transactions, banks and insurance companies also participate, a negotiating bank system 20 of the seller side, an issuing bank system 24 on the buyer side, and an insurance company system 22 for signing up for a cargo insurance policy are installed. In this embodiment, the seller belongs to country A, while the buyer belongs to country B. Consequently, in country A, a certification authority system 26 of the certification authority for issuing the public key certificate is installed and the seller, transportation company, negotiating bank, and insurance company that belong to country A acquire the public key certificate to be used for electronic transaction from the certificate authority system 26. On the other hand, the issuing bank and the buyer that belong to country B acquire the public key certificate to be used for electronic transactions from the certificate authority system 28 of the country B.

FIG. 2 shows the server and clients in the electronic transaction system of FIG. 1 and further the data transmission form in the system. First of all, to the certification authority system of country A, client 14 for seller, client 18 for transportation company, negotiating bank system 20, and insurance company system 22 acquire the public key certificate to be used for electronic signature in accessing the electronic transaction server 10 installed in the electronic transaction services organization 12. For the certification authority system 28 of country B, client 16 for buyer and issuing bank system 24 acquires the public key certificate to be used for the electronic signature in accessing the electronic transaction server 10. Applications for acquiring the public key certificate to the certificate authority systems 26, 28 may not be limited to the on-line processing for the certificate authority systems 26, 28 in this embodiment but may be the application processing by man-made documents. In the electronic transaction according to the present invention, parties participating in the services provided by the electronic transaction services organization 12 make user registration to the database installed to the electronic transaction server 10. This user registration registers the user registration information including the public key certificate acquired from the certificate authority systems 26, 28 that exercise jurisdiction over the parties themselves to the database of the electronic transaction server 10. Upon completion of the user registration to the database of the electronic transaction server 10, first, the client 18 for transportation company initially registers the shipment information including the cargo owner information to the database of the electronic transaction server 10 with respect to the exportation of the specific cargo. Upon completion of the initial registration of shipment information, based on the request from the client 14 for seller, for example, transfer registration processing of the cargo ownership to the client 16 for buyer is carried out. That is, the client 14 for seller transmits a request for changing registration of shipment information initially registered to the database of the electronic transaction server by the client 18 for transportation company. To the request for changing registration of shipment information, the digital signature of the seller and the public key certificate are attached. The electronic transaction server 10 that receives the request for changing registration of the title information from the client for seller transmits the contents of the request to the client 16 for buyer to obtain its approval and at the same time verifies that the digital signature attached to the request for changing the registration has been prepared by the private key that makes a pair with the public key certificate in the user registration information of the seller which has been registered in advance in the database. When the approval from the buyer and verification of the digital signature are obtained, the electronic transaction server changes the cargo owner on the database to the buyer. Finally, the client 16 for buyer makes the closure request for completing the passage of title to the electronic transaction server 10 with the digital signature and the public key certificate attached, and upon the receipt of this, the electronic transaction server 10 verifies the digital signature, closes registration of shipment information on the database, and prohibits changes of the cargo owner. With this, the transaction is completed, and finally, the buyer has the imported cargo delivered from the transportation company. In actual trading transaction, the title to the cargo is passed from the seller as the exporter to the negotiating bank 20, then to the issuing bank of the importing country, and finally to the buyer from the issuing bank. Even in this event, the client 14 for seller makes a request for changing registration of the cargo owner information to the electronic transaction server 10, then, the negotiating bank system 20 makes a request for changing the registration of cargo owner information to the electronic transaction server 10, and upon receipt of this request, the electronic transaction server 10 changes the cargo owner information on the database to the issuing bank of the importing country, and finally, upon receipt of the request for changing registration of cargo owner information from the issuing bank 24, the electronic transaction server 10 processes to change the cargo owner information to the buyer.

Figure 3A:
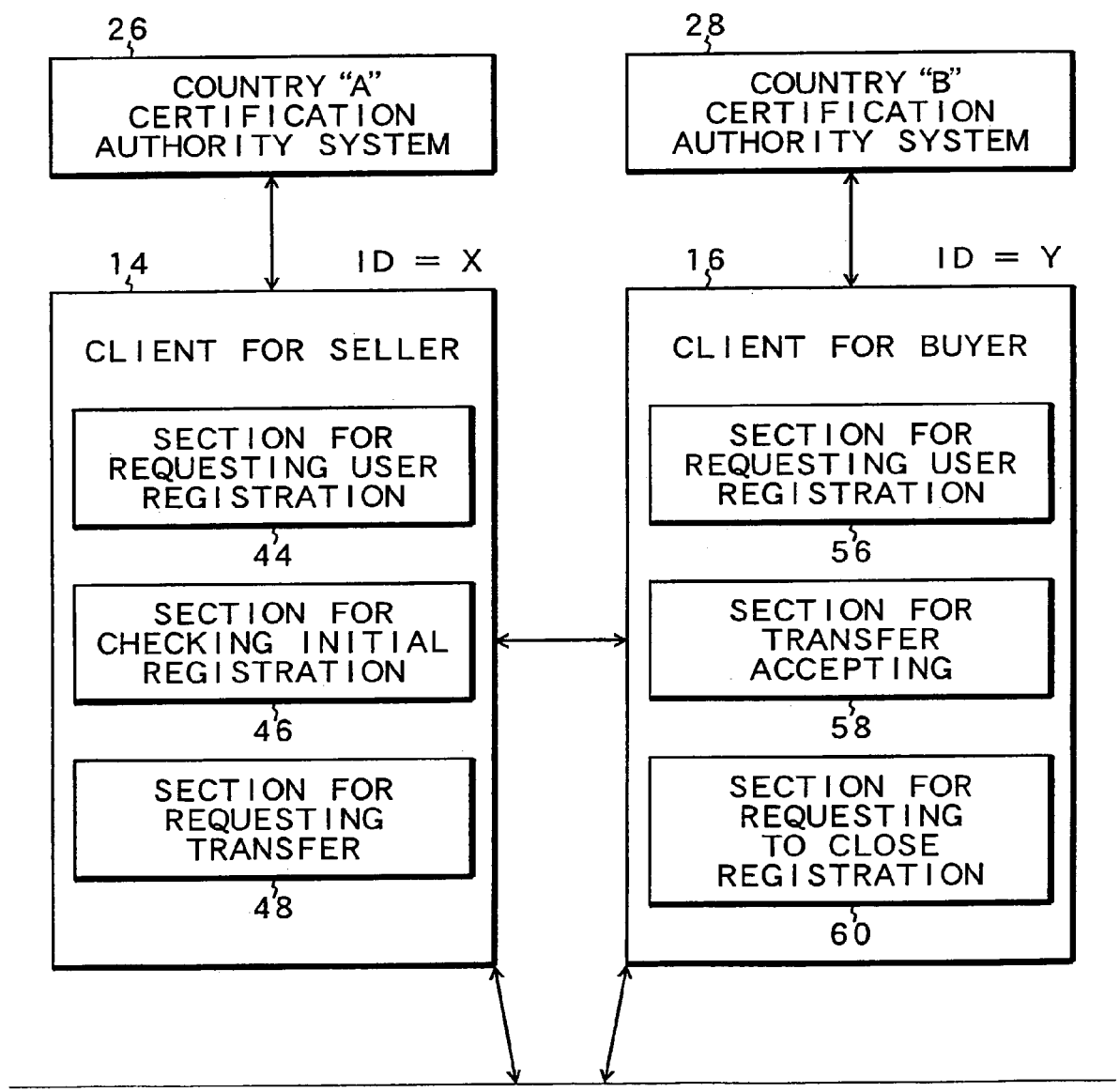
FIG. 3A, 3B are functional block diagrams of one embodiment according to the present invention with the certification authority, seller, buyer, transportation company, and electronic transaction services organization designated as the parties.
Figure 3B:
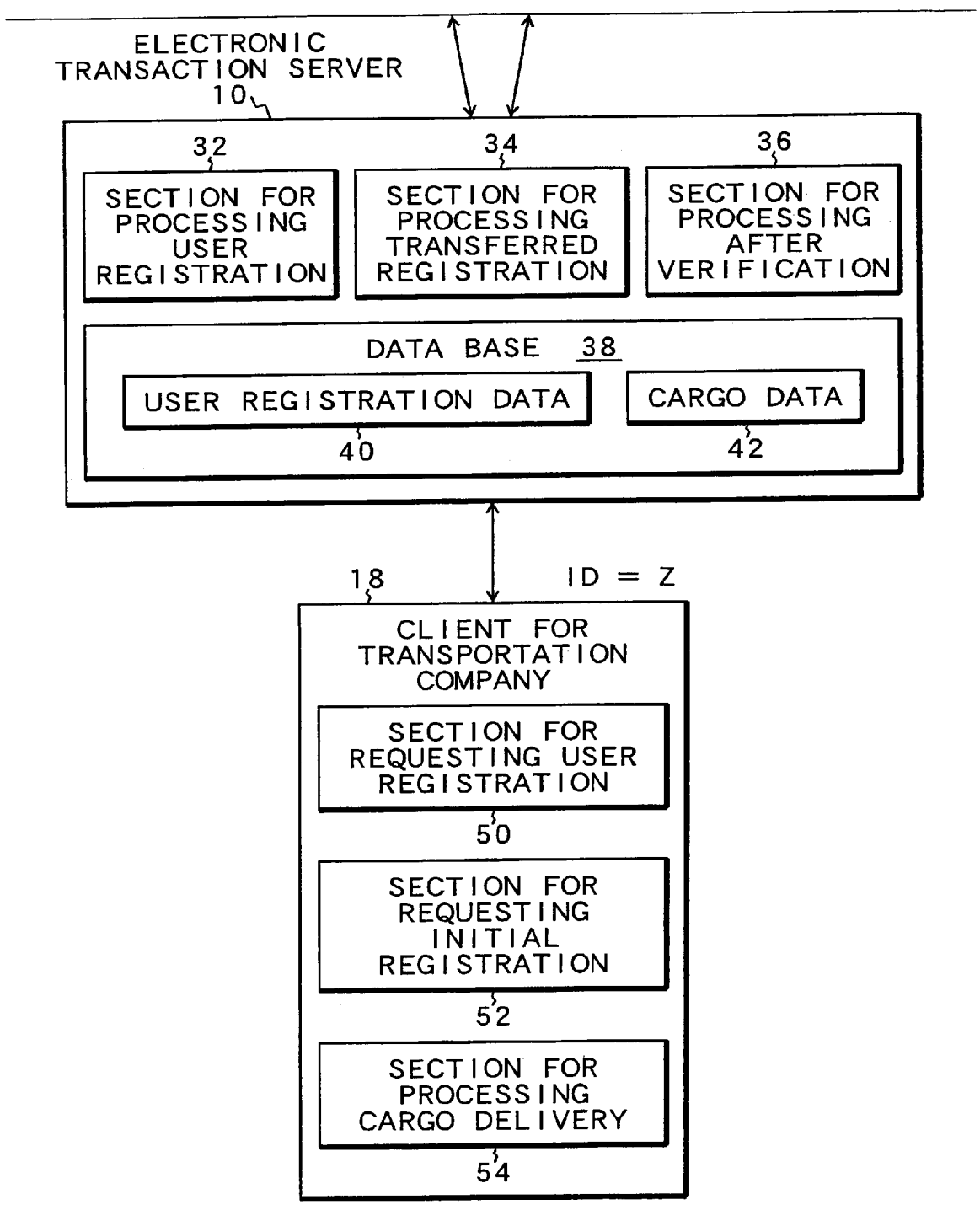

FIG. 3A, 3B are functional block diagrams of one embodiment according to the present invention with the certification authority, seller, buyer, transportation company, and electronic transaction services organization designated as the parties. First of all, to the electronic transaction server 10, a user registration processor unit 32, transfer registration processor unit 34, verification processor unit 36, and database 38 are installed. To the database 38, user registration information 40 of parties such as seller, buyer, transportation company, etc. are registered, and every time transaction is made, the shipment information 42 containing the cargo owner information is registered. To the client for buyer 14, a user registration requesting unit 44, initial registration checking unit 46, and transfer requesting unit 48 are installed. To the client 16 for buyer, a user registration requesting unit 56, transfer accepting unit 58, and registration closer requesting unit 60 are installed. Further to the client 18 for transportation company, a user registration requesting unit 50, initial registration requesting unit 52, and cargo delivery processor unit 54 are installed. On request of a user registration requesting unit 44 of the client 14 for seller, user registration requesting unit 56 of the client 16 for buyer, and the user requesting unit 50 of the client 18 for transportation company, the user registration processor unit 30 of the electronic transaction server 10 registers the user registration information 40 including the public key certificate that each party acquired from the certificate authority systems 26, 28 that exercise jurisdiction over themselves to the database 38. The transfer registration processor unit 34 of the electronic transaction server 10 carries out processing for changing the owner of the cargo owner information 42 registered to the database 38 to the buyer in compliance to the request for changing registration with the digital signature and public key certificate attached by the transfer requesting unit 48 of the client 16 for seller. Furthermore, the verification processor unit 36 verifies that the digital signature attached to the request for changing registration from the client 14 for seller has been prepared by the private key that makes a pair with the public key certificate registered in the user registration information 40 of the database 38, and at the same time, transmits the contents of the request for changing registration to the transfer accepting unit 58 of the client 16 for buyer and receives the approval, and then, instructs the transfer registration processor unit to arrange the transfer registration that has legal binding force with respect to the change of cargo owner by the transfer registration processor unit 34. That is, by obtaining the verification of digital signature by the verification processor unit 36 and obtaining the approval for request for changing the registration from the client 16 for buyer as the other party, transfer registration with legal binding force is established. The initial registration of the shipment information 42 to the database 38 of the electronic transaction server is carried out by the unit for requesting initial registration 52 installed to the client 18 for transportation company. The unit for requesting initial registration 52 of the client 18 for transportation company receives cargo, the subject of transaction, from the seller as well as the shipment information, and makes a request for initial registration of shipment information to the electronic transaction server 10 with the digital signature and public key certificate attached, and on receipt of this, the transfer registration processor unit 34 of the electronic transaction server 10 makes a request for checking the request for initial registration of count information to the initial registration check unit 46 of the client 14 for seller, and upon receipt of the approval, initially registers shipment information 42 to the database 38. The shipment information 42 initially registered to the database 38 in this way has the cargo owner information contained in the shipment information 42 to the buyer based on the request when the request for changing registration from the client 14 for seller is received thereafter and the digital signature of the request for changing registration is valid and the confirmation of the other party is obtained.

Now description will be made on the necessary agreements between parties for building up the electronic transaction system as shown in FIG. 1 through FIG. 3B.

FIG. 4 is an illustration of existing business practice agreement which is the premise of the electronic transaction of the present invention. First of all, for the business practice agreement, a contract of carriage is executed between the seller 114 and the transportation company 118 for transporting the cargo. In addition, a banking agreement of export service 102 is executed between the seller 114 and the L/C negotiating bank 120 who has foreign exchange draft transactions with the seller 114. On the other hand, between the buyer 116, the exported country, and the issuing bank 124, a banking agreement 104 of import service is executed. Furthermore, between the negotiating bank 120 on the buyer 114 side and the issuing bank 124 on the buyer 116 side, an interbank agreement 106 is executed. This interbank agreement 106 includes the correspondent agreement, SWIFT rules, and UCP500. Furthermore, between the seller 114 and the insurance company 122, a contract 108 of insurance is executed for the exported cargo. In addition to the current practical business transaction agreements as shown in FIG. 4, following three agreements are executed for building up the electronic transaction system of the present invention:

(1) Certification Authority Agreement (CA Agreement)
(2) Electronic Transaction Services Organization Agreement (RSP agreement)
(3) Data Interchange Agreement (IA Agreement).

Figure 5:
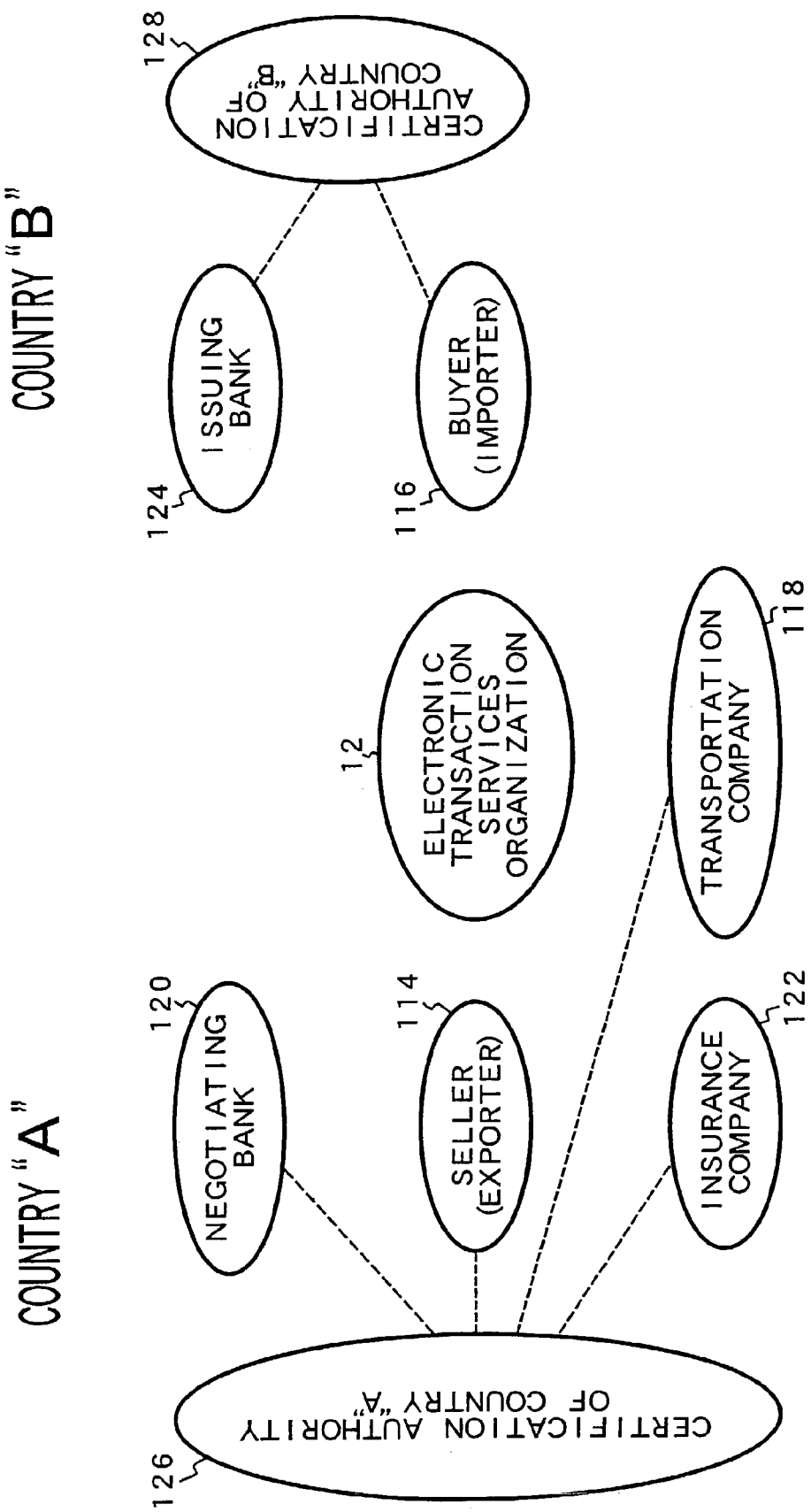
FIG. 5 is an illustration of the certification authority agreement that builds up the electronic transaction of the present invention.

FIG. 5 is an illustration of the certification authority agreement that builds up the electronic transaction of the present invention. The certification authority agreement is an agreement related to the issuance and the use of the public key certificate necessary for verification of the electronic signature. Since in the electronic transaction system of the present invention, the digital signature and the public key certificate are required when a request or approval to the server of the electronic transaction services organization 12, each of the parties who participate in the service system to which the electronic transaction service organization applies, seller 114, buyer 116, transportation company 118, negotiating bank 120, issuing bank 124, and insurance company 122 execute the certificate authority agreement, an agreement related to the issuance and the use of the public key certification required for verification of the electronic signature with the certificate authority of each country to which each party belongs. That is, the certificate authority agreements are executed between the certificate authority 126 of country A, the seller 114, transportation company 118, B/C negotiating bank 120, and insurance company 122, respectively. The certificate authority agreements are executed between the certificate authority 128 of country B and the buyer 116 and the issuing bank 124, respectively.

Figure 6:
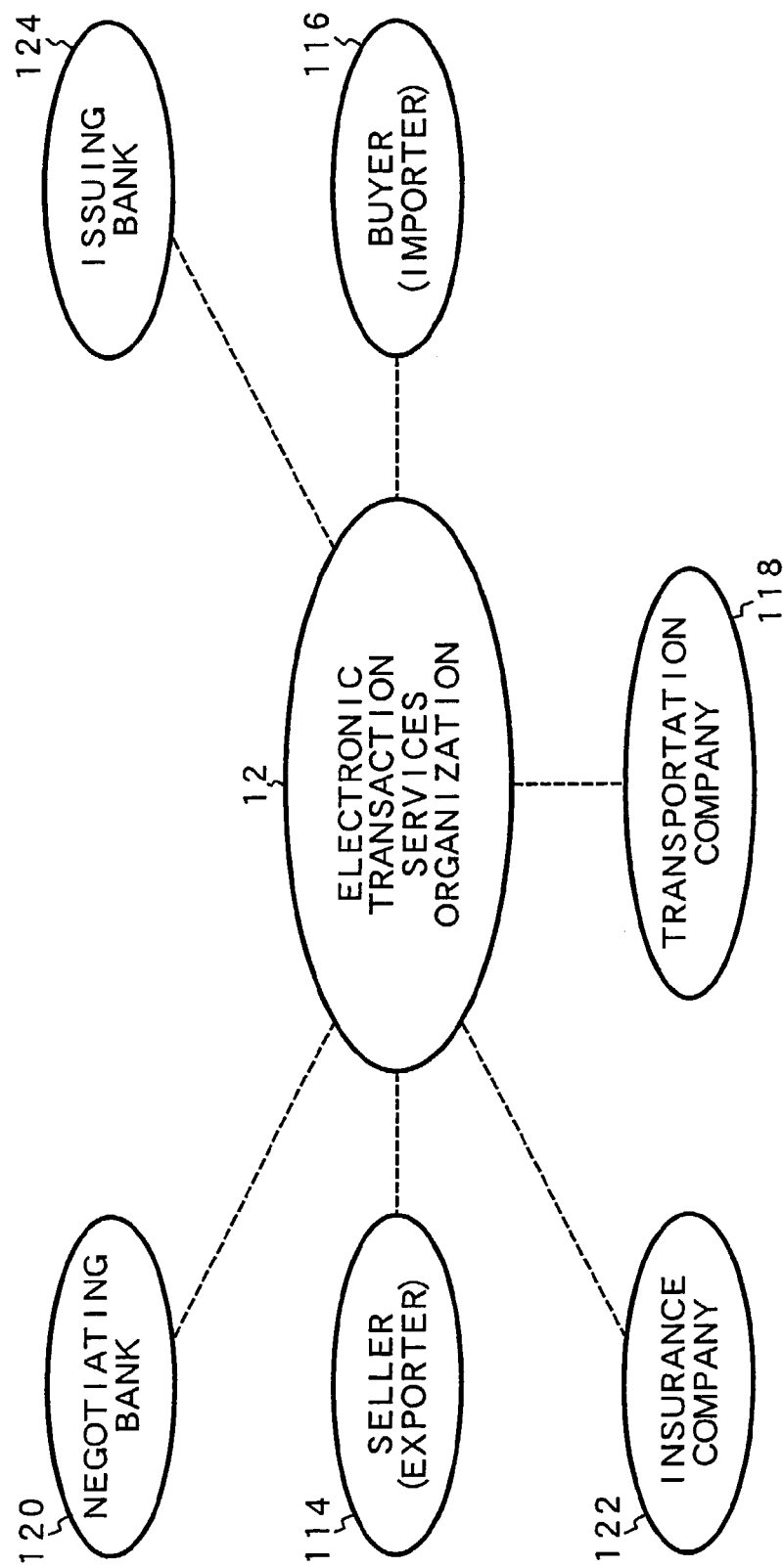
FIG. 6 is an illustration of the electronic transaction services organization that builds up the electronic transaction of the present invention.

FIG. 6 is an illustration of the electronic transaction services organization (repository service provider agreement: RSP agreement) that builds up the electronic transaction of the present invention. This electronic transaction services organization agreement is an agreement related to registering the shipment information containing the cargo owner information concerning the specific cargo, subject of the transaction, to the database of the server of the electronic transaction services organization and receiving their services. Consequently, electronic transaction services organization agreements are executed between the electronic transaction services organization 12 and the seller 114, the transportation company 118, the buyer 116, negotiating bank 120, issuing bank 124, and insurance company 122, parties to the transaction, respectively.

Figure 7:
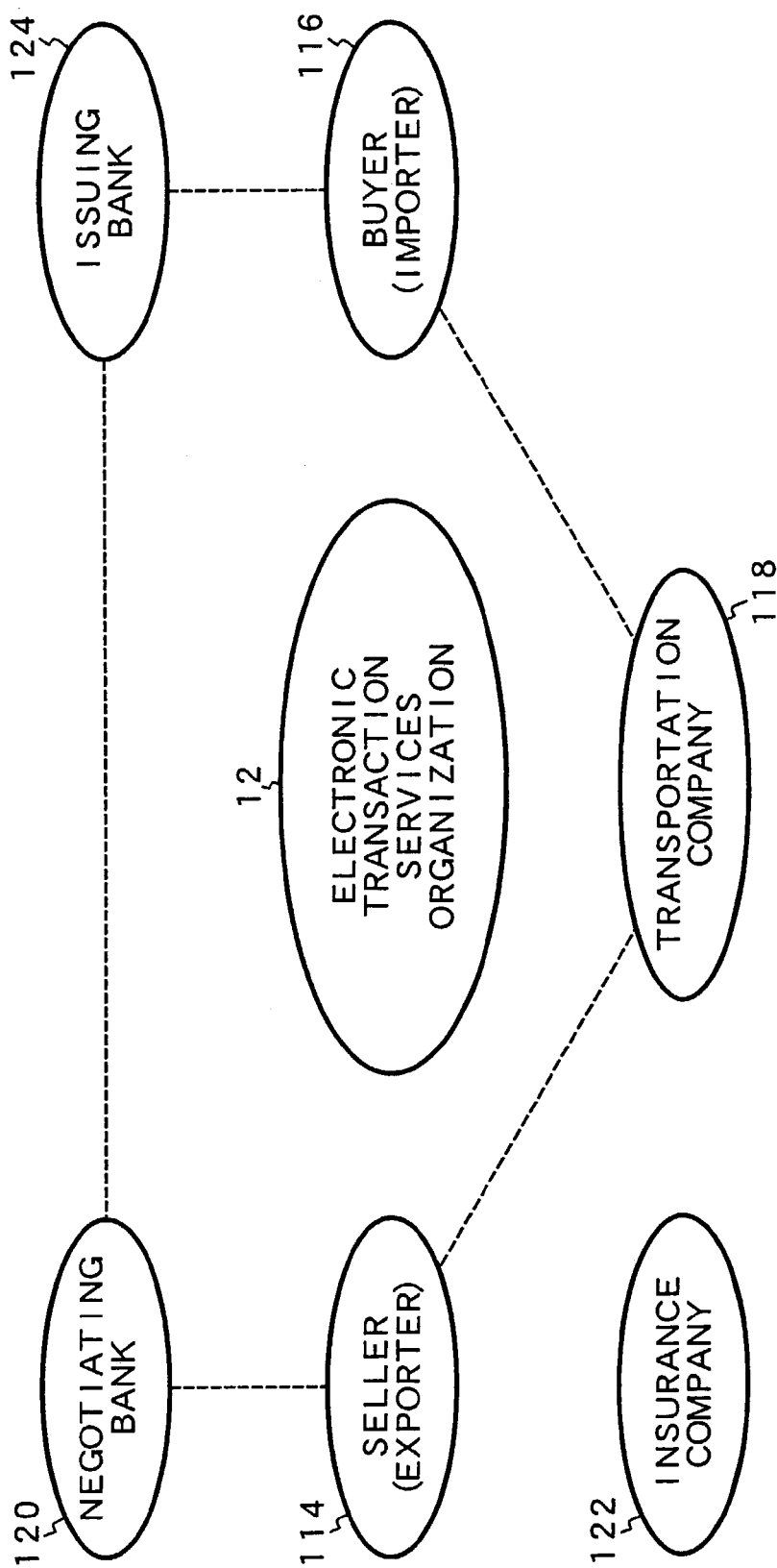
FIG. 7 is an illustration of the data interchange agreement that builds up the electronic transaction of the present invention.

FIG. 7 is an illustration of the data interchange agreement that builds up the electronic transaction of the present invention. The data interchange agreement is an agreement that causes the legal binding force between parties when the electronic transaction which has been carried out by documents called the bill of lading to date by registering the shipment information to the database controlled by the server of the electronic transaction service organization 12 accompanied by the electronic signature utilizing the public key certificate and following necessary procedures for electronic transfer for the cargo owner information contained in this shipment information. Consequently, the data interchange agreement is executed between direct parties to the transaction. That is, as an example of the data interchange agreement executed between transaction parties with direct transaction relations, the data interchange agreements are executed between the seller 114 and the transportation company 118, between the seller 114 and the negotiating bank 120, between the negotiating bank 120 and issuing bank 124, between the issuing bank 124 and the buyer 116, and furthermore between the transportation company 118 and the buyer 116, respectively.

In explaining this embodiment, to simplify the explanation, the electronic transaction procedures for the seller 114 to pass the title to the cargo directly to the buyer 116 is taken for the example, but in actuality, the registration of passage of the title to the cargo from the seller 114 to the B/L negotiation bank 120, and to the issuing bank 124 is carried out, and the explanation is made with the intermediate transfer condition omitted. Needless to say, it is possible to carry out transaction directly from the seller 114 to the buyer 116, and in such event, the data interchange agreement is executed between the seller 114 and the buyer 116.

Figure 8:
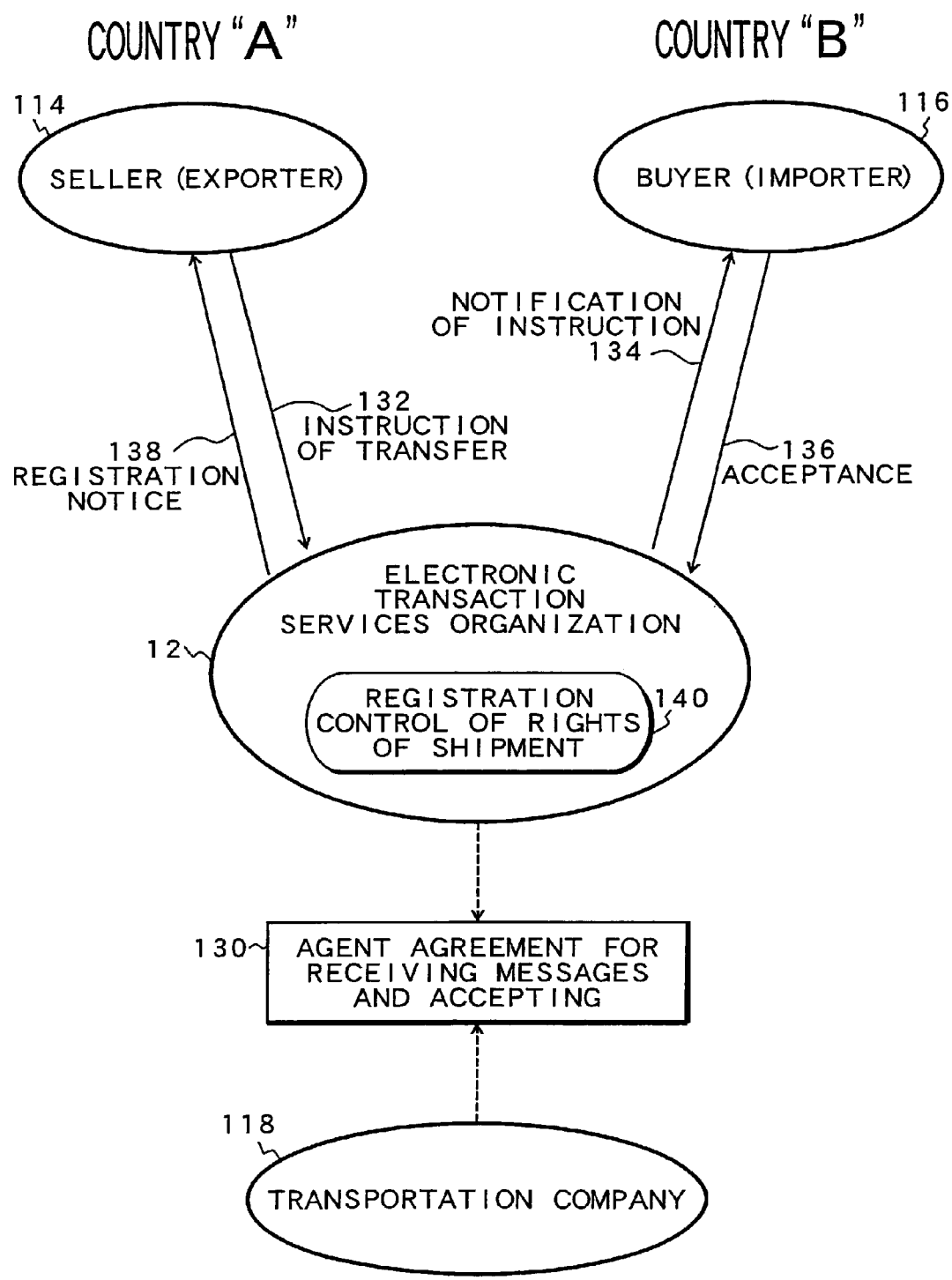
FIG. 8 is an illustration of agent agreement for receiving messages ad accepting the title to the cargo that builds up the electronic transaction of the present invention.

FIG. 8 is an illustration of an agent agreement for receiving messages and accepting concerning passage of the title to the shipment that builds up the electronic transaction of the present invention. The electronic transaction system according to the present invention is characterized in that the title to the cargo is electronically passed when the right holder who has the ownership to the cargo, the subject of the transaction, gives instructions of passage of title to the cargo to the transportation company 118 who occupies and transports the cargo electronically passing the title to the cargo. However, because in the current transportation company 118, there is no facilities readily available for registration control of the title to the cargo for this instruction, even if the transportation company receives the instructions from the cargo owner to electronically transfer the ownership, the electronic transaction services organization 12 acts as a proxy to implement the functions concerning the passage of the title to the cargo by the transportation company 118. That is, the seller 114, the present cargo owner, gives the instructions 132 to the electronic transaction services organization 12 which acts as a proxy of the transportation company 118 to pass the title to the cargo to the buyer 116, and the electronic transaction services organization 12 carries out registration control 140 of the title to the cargo corresponding to the instructions of passage 132. Specifically, when the electronic transaction services organization 12 receives the instructions of passage 132 from the seller 114, it carries out the transmission of this instruction 134 to the buyer 116, and when the buyer confirms the contents of the instruction and the organization receives the approval 136 from the buyer 116, the organization changes the cargo-owner information contained in the shipment information to the buyer 116 as the registration control 140 of the cargo ownership. When the change of the cargo owner is completed in this way, the organization sends the registration notice 138 to the seller 114, requester, and completes the procedures. In order for the electronic transaction services organization 12 to achieve the proxy services of the transportation company 118, the agent agreement 130 for receiving messages and accepting shall be executed between the transportation company 118 and the electronic transaction service organization 12. The proxy passive right acts for the right of the transportation company 118 to receive the transfer instructions from the current cargo owner. The proxy active right acts for the right of the transportation company to receive approval from the right transferred party and to give permission to the transfer instruction received from the current cargo owner. When the agent agreement for receiving messages and accepting is executed, the electronic transaction service organization 12 gives notice to the transportation company 118 every time it receives the instruction received and receives the approval from the transportation company 118.

Now, taking the embodiment of FIG. 3 for an example, the user registration and electronic transaction services in the electronic transaction system according to the present invention will be described in detail.

Figure 9:
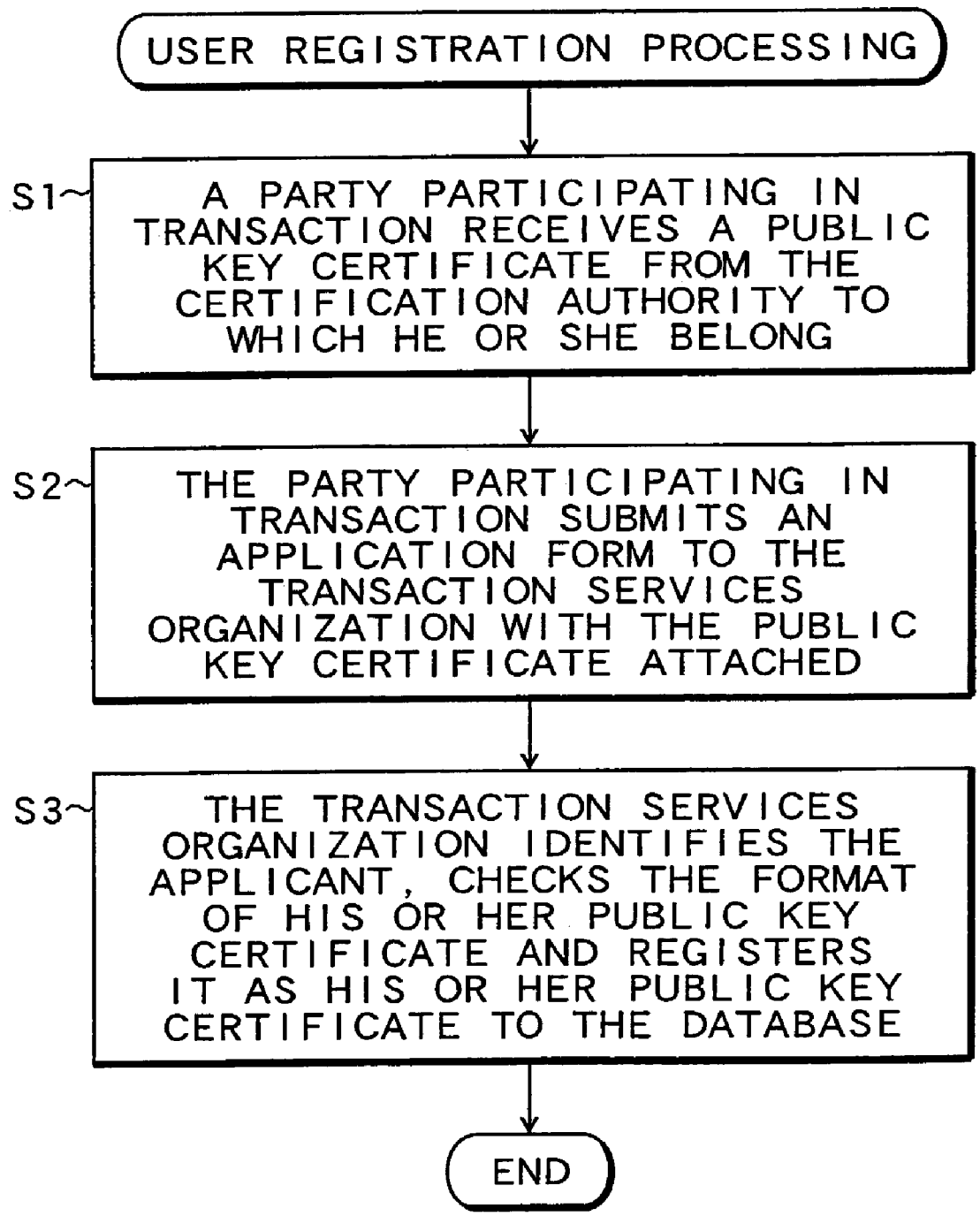
FIG. 9 is a flow chart of the user registration processing of transaction parties for the electronic transaction server of the present invention.
Figure 10:
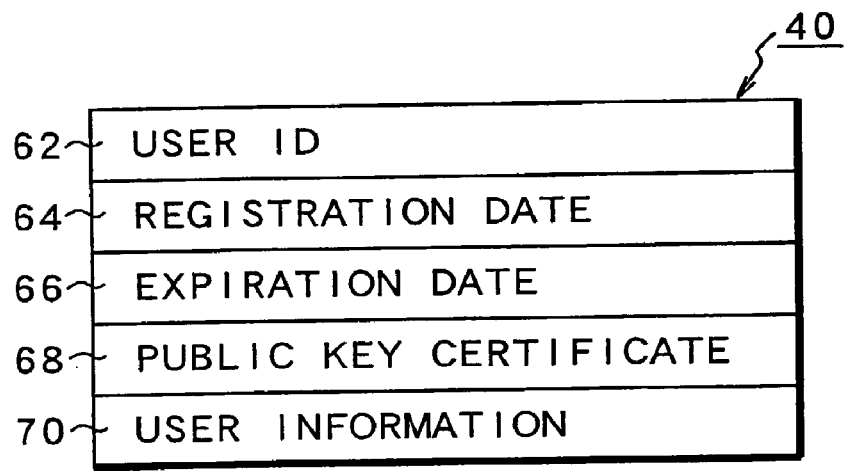
FIG. 10 is an illustration of user registration information to be registered to the database of FIG. 3.

FIG. 9 is a flow chart of the user registration carried out between the electronic transaction server 10 of FIG. 3 and parties who participate in the service, namely, client 14 for seller, client 16 for buyer, and client 18 for transportation company. In this user registration processing, first of all, in Step S1, each of the seller, buyer, and transportation company, who are transaction parties participating in the electronic transaction services, receive the public key certificate from the certificate authority to which each of them belongs. For example, the seller who possesses the client 14 for seller receives the public key certificate that corresponds to the private key which the seller only possesses to the certificate authority system 26 of country A to which the seller belongs, and the public key certificate issued by the certificate authority system 26 in this way is subject to the revoke control of the certificate in the certificate authority. Consequently, it is possible to confirm that the subject really exists by using the public key certificate for the electronic transaction according to the present invention. When the seller, buyer, and transportation company receive the public key certificate, respectively, from the certificate authority to which each of them belongs in Step S1, then, in Step 2, they present the computerized application with the public key certificate received to the electronic transaction services organization. Specifically, the user registration requesting units 44, 50, 56 installed to the client 14 for seller, client 16 for buyer, and client 18 for transportation company, respectively, apply to the electronic transaction server 10 for user registration with the public key certificate received from the certificate authority attached, and in response to this, the user registration processor unit 32 registers the user registration information 40 to the database 38. FIG. 10 shows the data construction of user registration information to be registered to the database, which comprises user ID 62, user registration date 64, user registration expiration date 66, public key certificate 68 received from the certificate authority, and user information 70.

Figure 11:
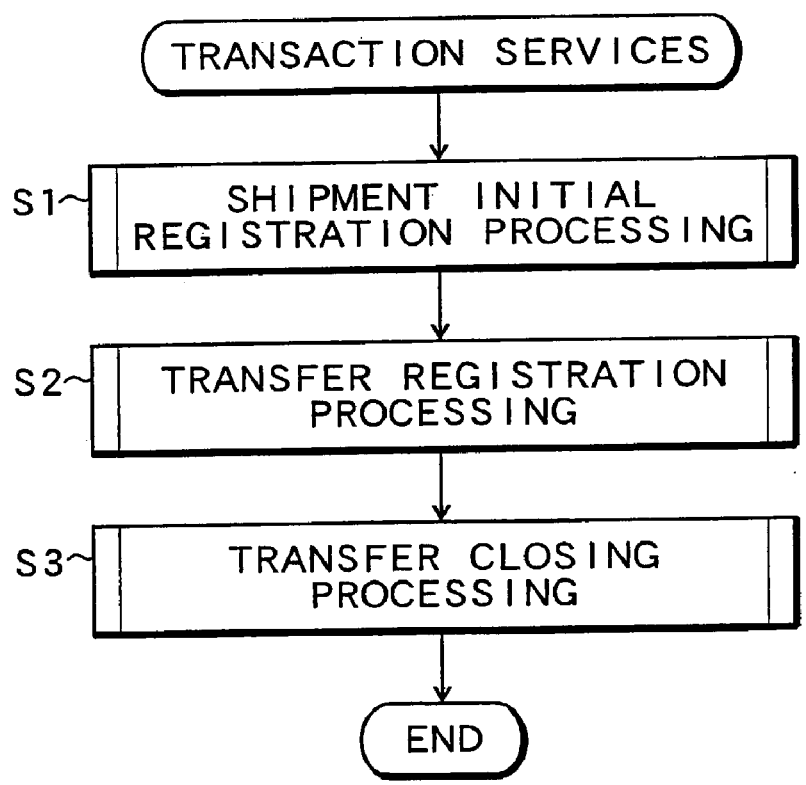
FIG. 11 is a flow chart of transaction services of the present invention by the electronic transaction server of FIG. 3.

Next description will be made on the electronic transaction services after the user registration information 4 of the seller, buyer, and transportation company, parties to the transaction, has been registered to the database 38. FIG. 11 is a flow chart of overall processing procedures of the electronic transaction services built up by the present invention. The electronic transaction services according to the present invention comprise the three stages of processing procedures, namely, the initial cargo registration processing of Step S1 when the cargo, subject of the transaction, is received by the transportation company from the seller in compliance with the contract of carriage, the title passage registration processing of Step S2 that takes place successively, and the title passage completion processing of Step 3 which is the final processing.

Figure 12:
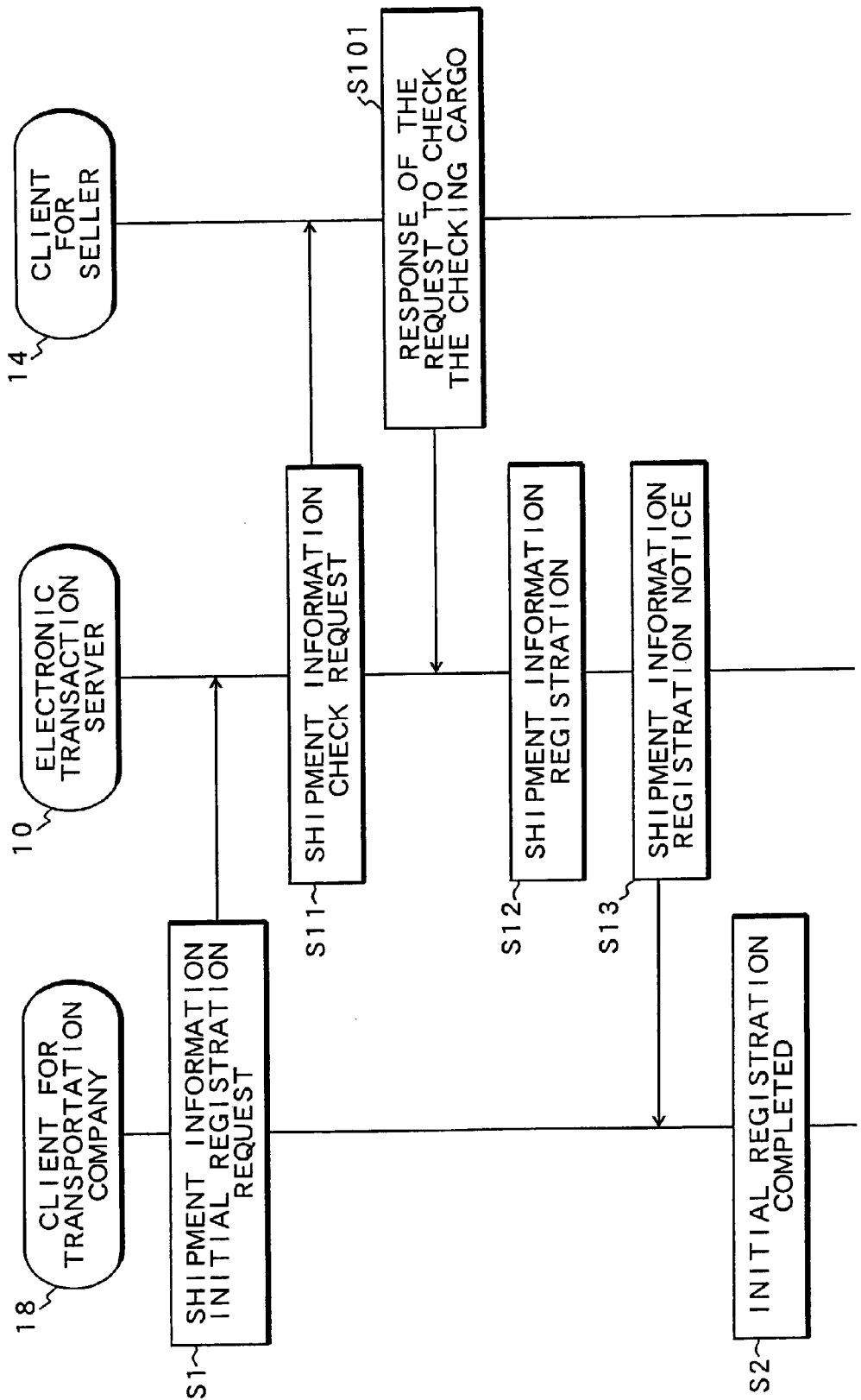
FIG. 12 is a time chart of initial cargo registration processing of FIG. 11.

FIG. 12 is a time chart of initial cargo registration processing of Step S1 in FIG. 11. In this initial cargo registration processing, first of all, the client 18 for transportation company transmits the initial registration request of the information of cargo requested by the seller in Step S1 to the electronic transaction server 10. The electronic transaction server that receives this initial registration request transmits the shipment information contents check request to the client for the seller of the seller who is the current cargo owner in Step S11. The client 14 for seller that receives this contents check request checks the contents of the shipment information in Step S101, and returns to the electronic transaction server 10 the response in that it is correct if it is correct, and it is erroneous if it is erroneous. When the electronic transaction server 10 receives the check response of shipment information from the client 14 for seller, the electronic transaction server 10 registers the shipment information to the database 38 in Step S12. And in Step S13, the electronic transaction server 10 transmits the registration notice that the shipment information has been properly registered in Step S13 to the client 18 for transportation company, the requester, and in Step S2, the client 18 for transportation company completes the initial registration processing when the notice is received.

FIG. 13 is an illustration of the communication message sent from the client side including the initial registration request of the shipment information of FIG. 12. This communication message 72 comprises a sender ID 74, shipment information ID 75, instruction to services organization 76, subsequent holder of rights ID 78, shipment information 80, and digital signature 82. The digital signature 82 is a digital signature generated on the basis of the public key certificate which the sender received from the certificate authority and the private key for transmission, and can be verified by the public key certificate in the user registration information 40 already registered to the database 38 side of the electronic transaction server 10.

FIG. 14 is the data construction of shipment information 42 registered to the database 38 by the initial registration request of shipment information of FIG. 12. The shipment information 42 registered on this database 38 comprises the fixed information 84 and the updated information 85. In the fixed information 84, shipment information ID 86, hash value 88 of shipment information, date and time of shipment information registration 90, and shipment information 92 including the initial registered person are stored, and of these, the hash 88 value of shipment information is the value calculated by hashing on the basis of the shipment information ID 75 in the transmission message 72 of FIG. 13, and with this hash value 88 used as an entry, the shipment information 42 is registered to the database 38. On the other hand, in the updated information 84, cargo access right holder information 94, cargo owner information 95, information 96 on rights appendant to cargo such as right of pledge, etc., and date and time 98 of altered shipment information registration are installed. The access right holder identified by the cargo access right holder information 94 is the person who can change the database and indicates the person who occupies the cargo. However, since the person who occupies the cargo is not always the cargo owner, the data item called the cargo owner information 95 that indicates the cargo owner is provided. Now, let ID=X denote the seller ID of the client 14 for seller in FIGS. 3A and 3B and ID=Y the buyer ID of client 16 for buyer; then, the seller ID=X who is the current cargo owner is stored in the access right holder information 94 and the cargo owner information 95, respectively, in the updated information 80 of the shipment information 42 registered to the database 38, in accordance with the initial registration request of the shipment information from the client 18 for transportation of FIG. 12.

Figure 15A:
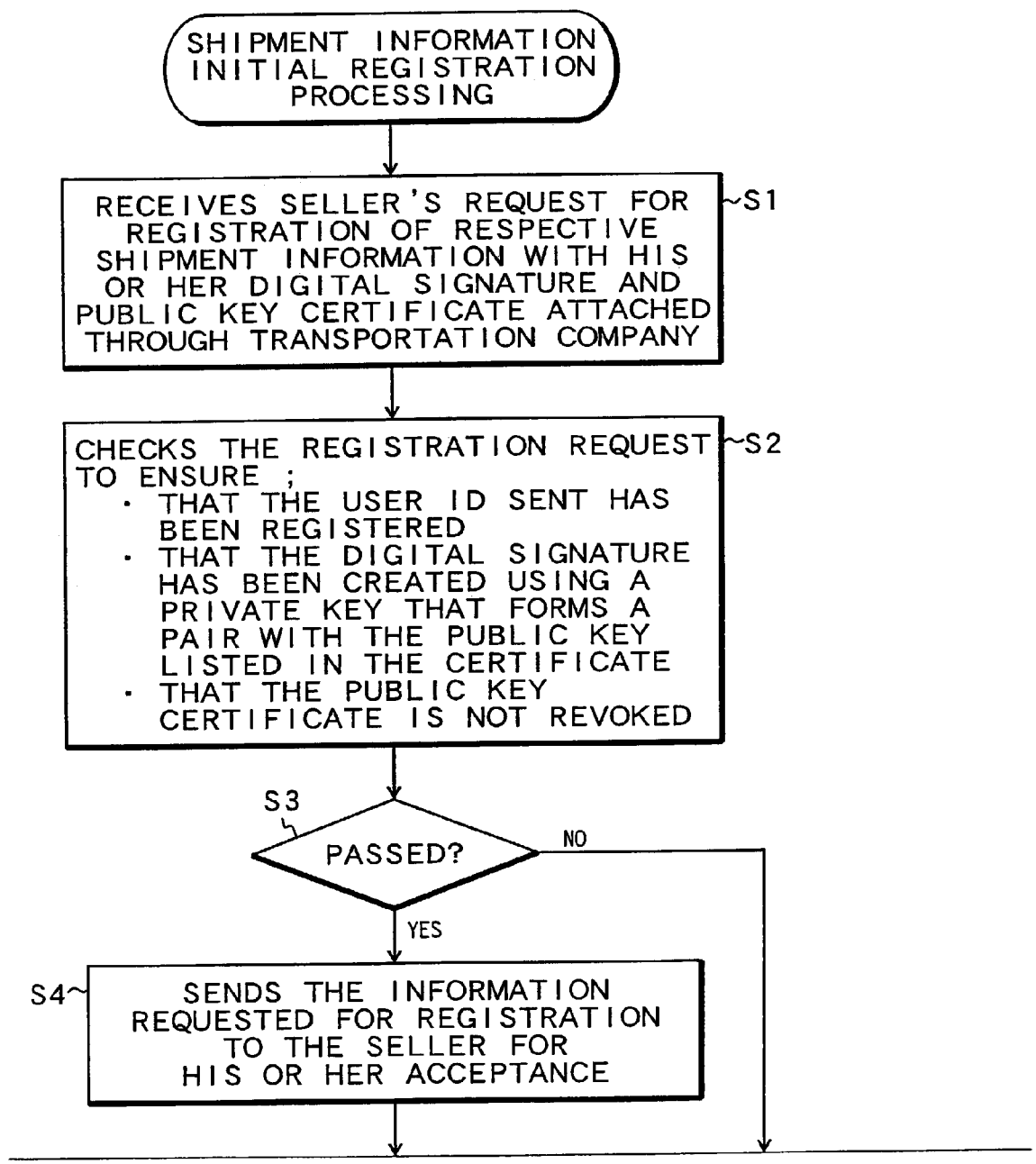
FIG. 15A, 15B are flow charts showing the detail of the shipment information initial registration processing of FIG. 11.
Figure 15B:
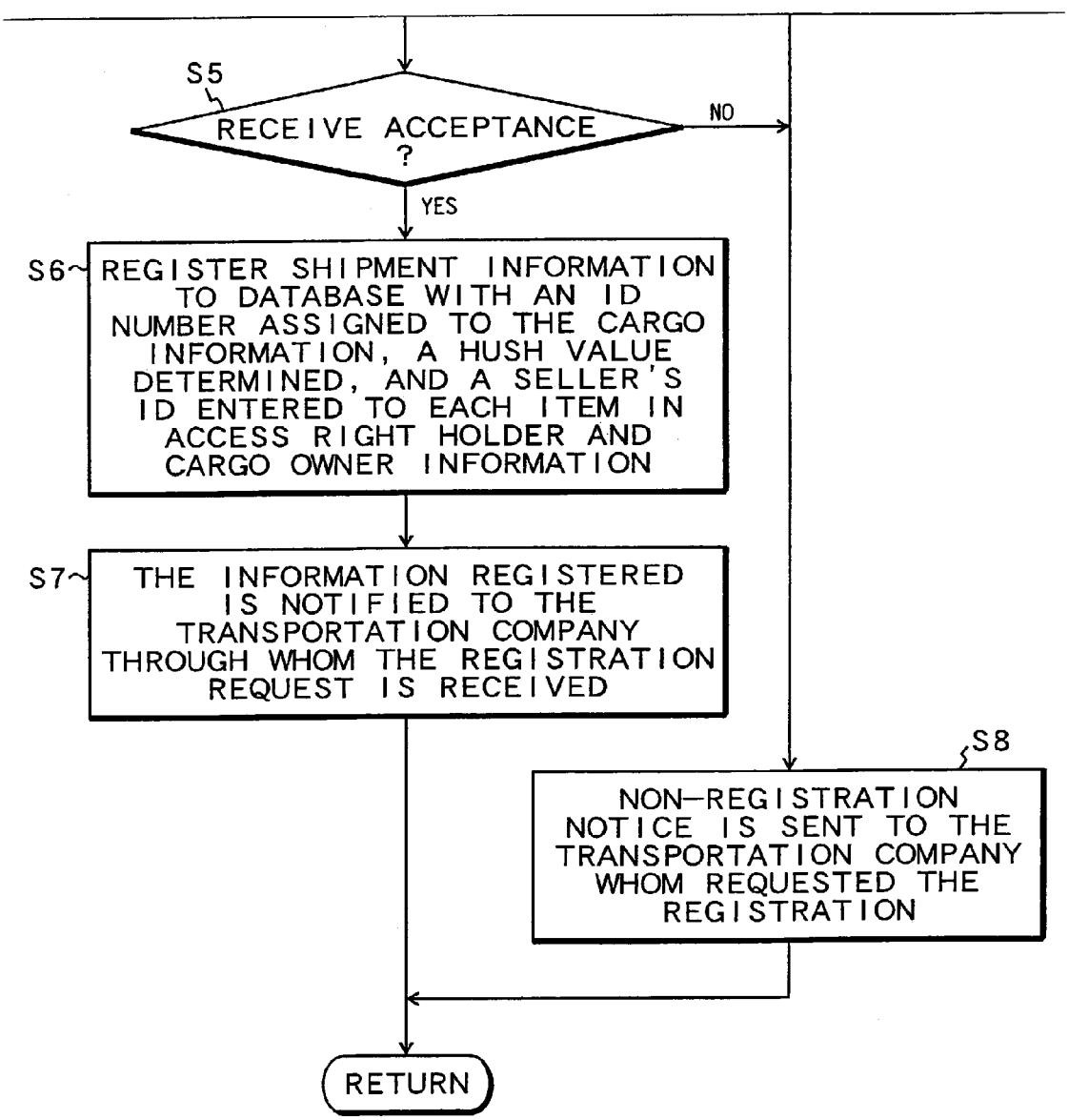

FIG. 15A, 15B are flow charts showing the detail of the shipment information initial registration processing of S1 in FIG. 11. In the initial registration processing of this shipment information, when the request for registration of shipment information of the seller with the digital signature (electronic signature) and the public key certificate attached to the shipment information in Step S1 is received from the client 18 for transportation company, the process moves to Step S2, and the contents of the initial registration request of the shipment information requested is checked. The registration request is checked for the following three items:

(1) The user ID transmitted is registered to the user registration information 40 of the database 38.

(2) The digital signature has been prepared by the private key which makes a pair with the public key certificate registered.

(3) The public key certificate has not been revoked.

When all these three checks of the registration request in Step S2 become valid and acceptance is received for all the checks, the process moves to Step S4, where the registration request information is transmitted to the client 14 for seller, the seller who is a current cargo owner, and the client for seller is requested for checking the contents. When the content check is received from the client 14 for seller in Step S5 with respect to this check request, the process moves to Step S6, an ID number is assigned to the shipment information, a hash value 88 of the shipment information in FIG. 14 is calculated, seller ID=X is entered in each of the items of access right holder information 94 and cargo owner information, and the shipment information 42 is registered to the database 38. Finally, in Step S7, the completion of initial registration is notified to the client 18 for transportation company through whom registration request is received. On the other hand, if the check of requested contents proved to be not correct in Step S3 or confirmation of the seller cannot be obtained in Step S5, closure-registration notice is sent to the transportation company 18 through whom the registration request is received.

Figure 16:
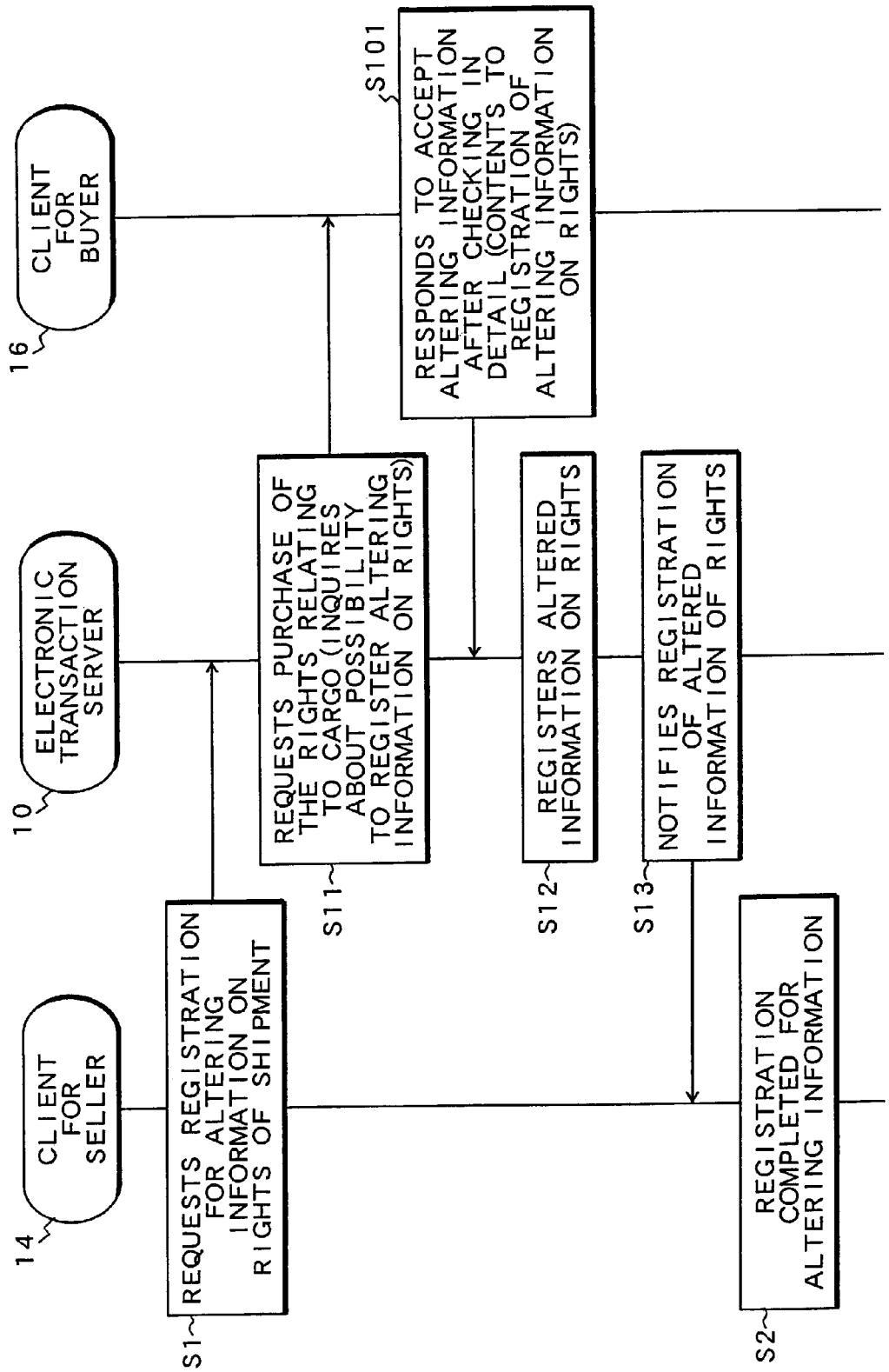
FIG. 16 is a time chart of title transfer registration processing of FIG. 11.

FIG. 16 is a time chart of title transfer registration processing in Step S2 of FIG. 11. In this title transfer registration processing, first of all, the client 14 for seller transmits the message of requesting registration for altering information on rights of shipment to the electronic transaction server 10 to change the ownership from seller to buyer in Step S1. The electronic transaction server 10 who received this request for registration change transmits a request for purchasing the right concerning the cargo, that is, an inquiry about possibility of registration change of the information of rights to the client 16 for seller together with the contents of the request of registration change in Step S11. To this inquiry of checking the contents of request for registration change, the client 16 for buyer checks the contents of change in the information of rights in Step S101, and returns the response to agree with the registration change of the information of rights if the contents are correct, and returns the response to disagree with the registration change if incorrect. When the response to agree with the registration change is obtained, the electronic transaction server 10 carries out registration change of the information of rights in Step S12, that is, changes the present cargo owner information contained in the shipment information on the database 38 to the buyer requested. And in Step S13, the electronic transaction server 10 transmits to the client 16 for buyer, the requester, that the registration for altering information on rights of shipment has been completed in Step S13, and the client 14 for buyer recognizes the completion of registration of altered information in Step S2 by receiving the notice.

FIG. 17 is an illustration of shipment information 42 of the database 38 updated by change registration processing of information of rights of FIG. 16. This shipment information 42 is the same as the registered contents of the initial registration request from the client for transportation company shown in FIG. 14 with respect to the fixed information 86 and the updated information 84, but in addition to this, updated information 85-1 is added by the request for registering the change in FIG. 16. This updated information 851 has the access right holder information 94-1 changed to the buyer ID=Y by the request for registering the change, and by the registration of this shipment information 42 to the database 38, the fact in that the present cargo occupant is the buyer who has ID=Y is generated with the legal binding force. If there is the cargo right holder information 85-1 is present in this request for registration to change, the fact in that the present cargo occupant is the buyer who has ID=Y is generated with the legal binding force.

Figure 18A:
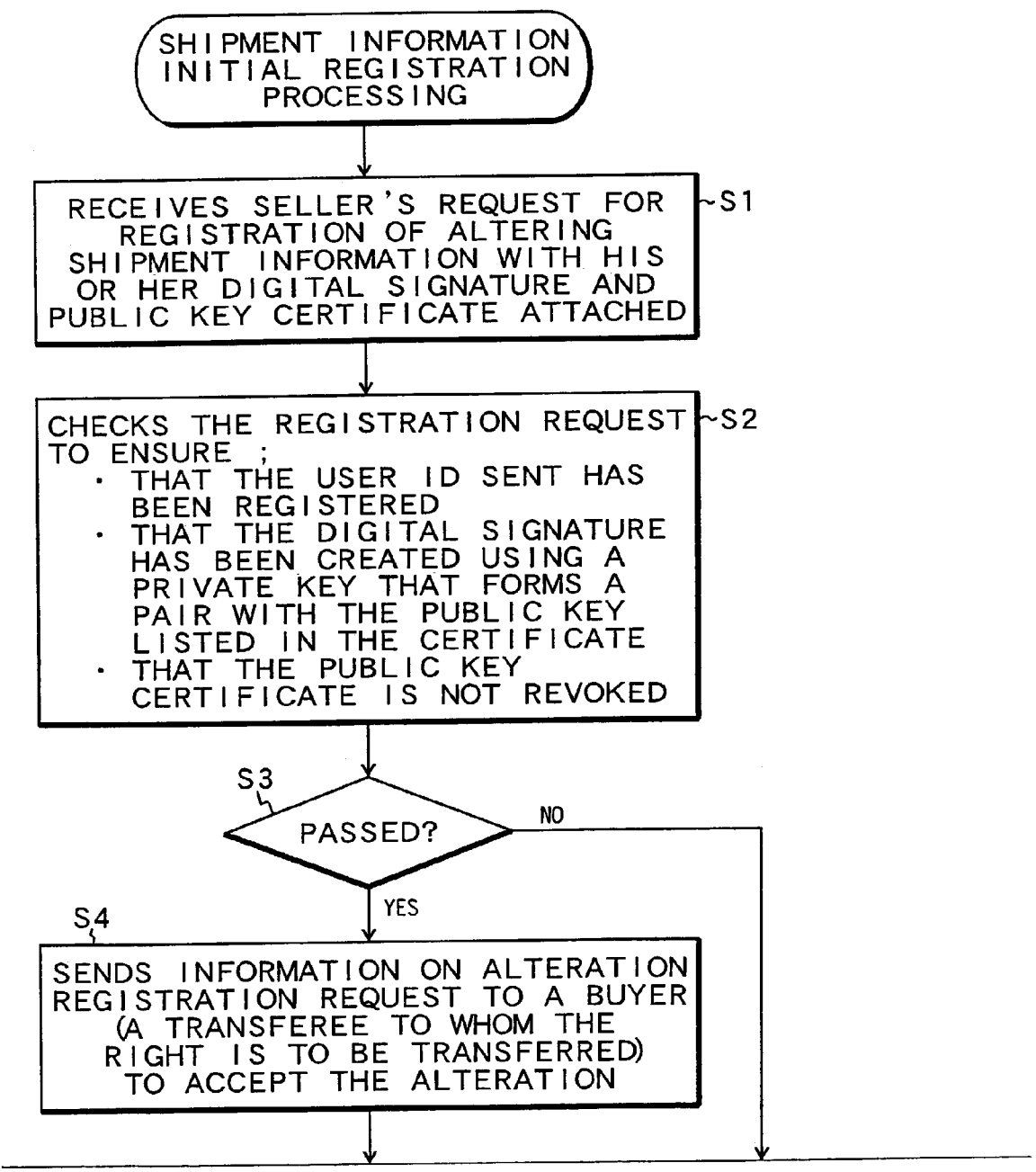
FIG. 18A, 18B are flow charts showing the detail of the title transfer registration processing of FIG. 11.
Figure 18B:
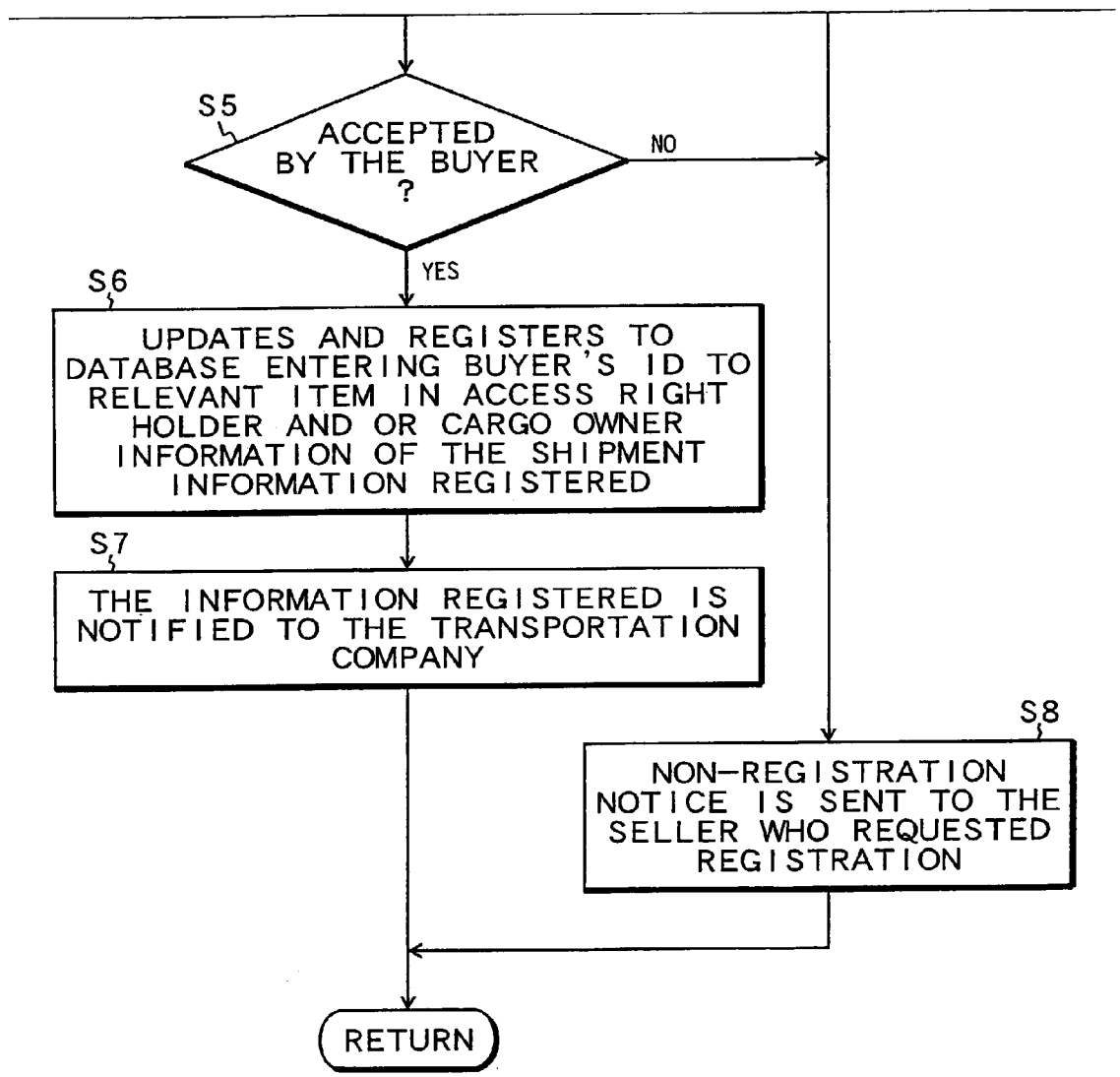

FIG. 18A, 18B are flow charts showing the detail of the title transfer registration processing in Step S2 of FIG. 11. This title transfer registration processing checks the contents of the request for registration in Step S2 when the request for registration of altered shipment information is received with their digital signature and public key certificate attached for the shipment information from the client 14 for seller in Step S1. The contents of the request for registration are checked for the three points: the user ID transmitted is registered; the digital signature is prepared by the private key that makes a pair with the public key certificate to which the digital signature is registered; and the public key certificate is not revoked. When the check results of Step S2 are accepted in Step S3, the information on alteration registration request is sent to the buyer, the transferee, the subject of altered registration, in Step S4, and the client for buyer is asked to accept the alteration. When the response of acceptance is received from the client 16 for buyer in Step S5, the new updated information 85-1 like the shipment information 42 of FIG. 17 is created in Step S6, ID=Y of the buyer, the transferee, is stored in each of the items of the access right holder information 94-1 and the cargo owner information 95-1 of the updated information 85-1, respectively, and the cargo appendant right information 96-1 of the contents same as the first updated information 85 is provided, and the date and time for registering the altered shipment information 98-1 in the present title transfer registration is stored, and registered to the database 38. And in Step S7, the contents of registration change are notified to the client 14 for seller who requested, and a series of title transfer registration processing are completed. If in Step S3, acceptance cannot be obtained on any of the three items in Step 2 or the buyer acceptance confirmation cannot be obtained in Step S5, the closure-registration is notified to the client 14 for seller, requester, in Step S8.

FIG. 19 is a time chart of title transfer completing processing in Step S3 of FIG. 11. In completing this title transfer, the client 16 for buyer transmits the request to close registration of corresponding information of rights the electronic transaction server 10 in S1. The electronic transaction server 10 who received this request to close registration closes the database of the information of rights requested in Step S11. For example, a closure number is assigned to the shipment information of the corresponding database, the flag that shows the change prohibit is made valid, and change of contents of the shipment information thereafter is prohibited. Upon completion of closure of the database of the information of rights requested, the closure of the registered database is notified to the client 16 for buyer, the requester, in Step S2 together with the closure number, and the client 16 for buyer recognizes the completion of closure registration in Step S2, and thereafter, the client for buyer receives the cargo delivered by the transportation company.

Figure 20A:
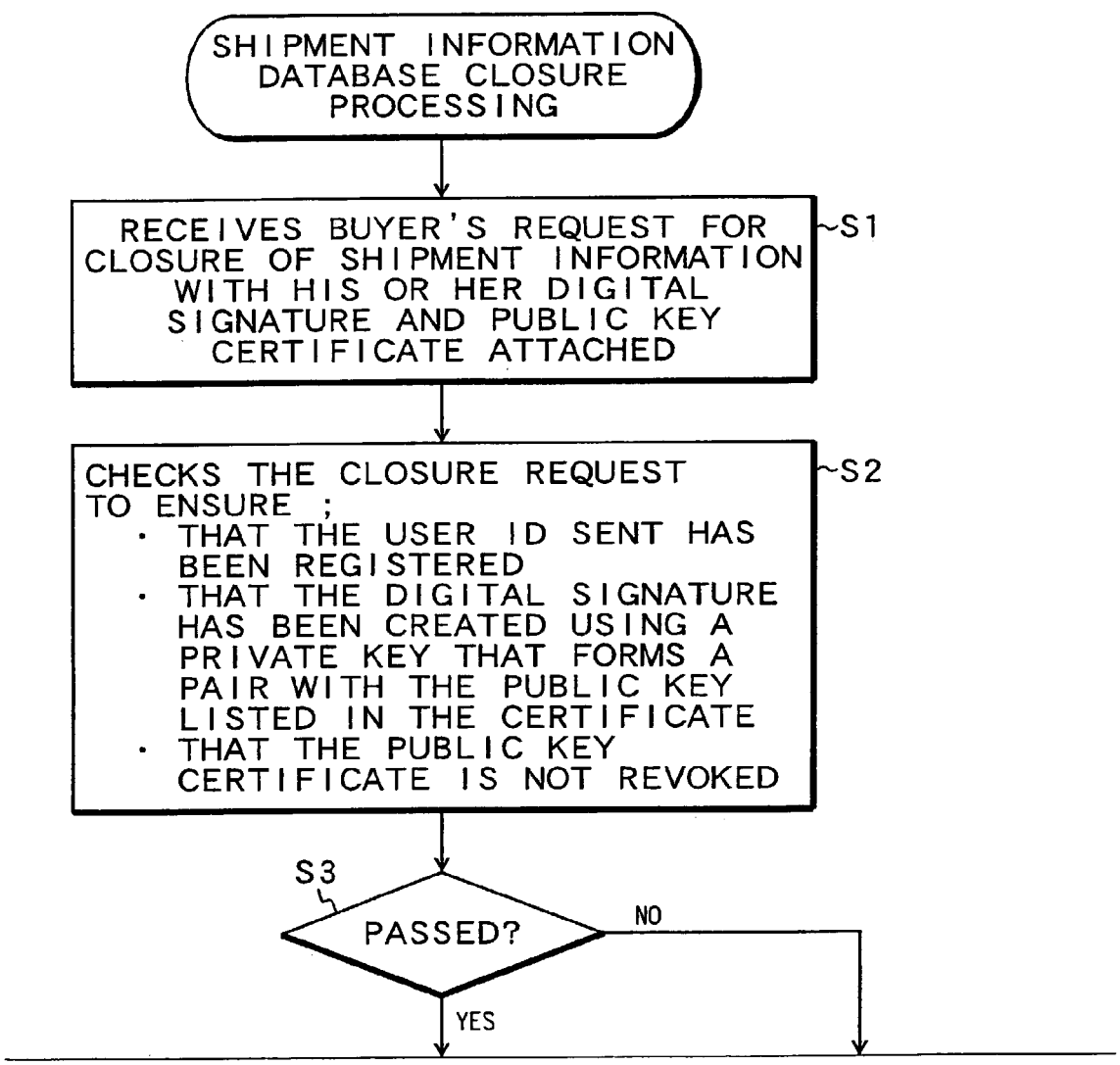
FIG. 20A, 20B are flowcharts showing the detail of the title transfer completing processing of FIG. 11.
Figure 20B:
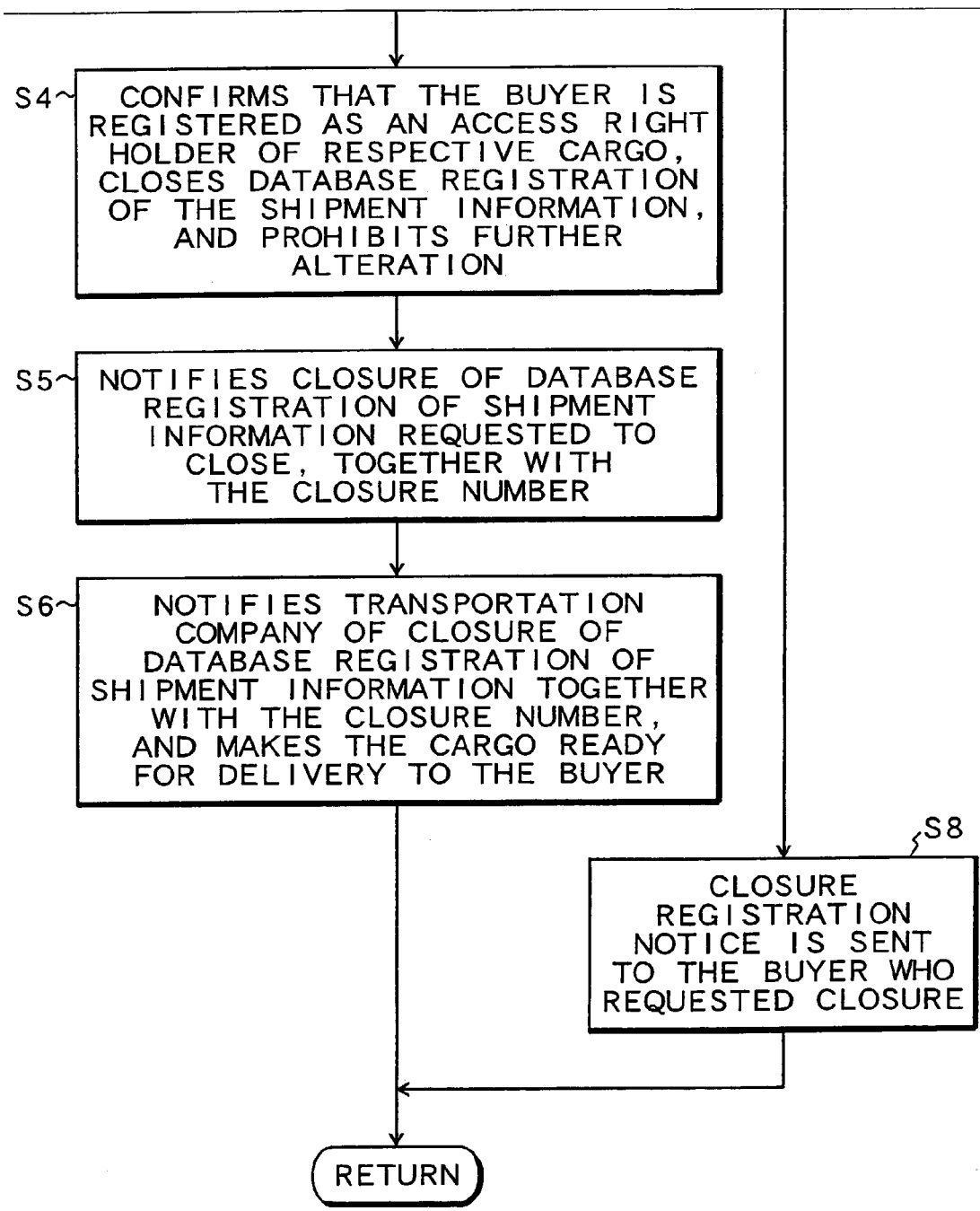

FIG. 20A, 20B are flow charts showing the detail of shipment information database closure processing, which is the title transfer closing processing in Step S3 of FIG. 11. In the shipment information database closing processing, when the closure request of shipment information with the digital signature and public key certificate attached is received from the client 16 for buyer in Step S1, the closure request is checked in the same manner for three items, and if all the check results are OK and accepted in Step S3 and after it is checked that the buyer, the requester, is the owner of the relevant cargo and is registered in the database in Step S4, registration of database of shipment information is closed and the change thereafter is prohibited. Then, in Step S5, the closure of the database registration of the shipment information requested is notified to the client 16 for buyer of the requester together with the closure number. And in Step S6, the closure of the database registration of the shipment information is notified to the client 18 for transportation company together with the closure number, and the cargo delivery enable state to the buyer is generated. When any of the three checks is not passed in Step S3, closure-registration will be notified to the buyer, the requester, in Step S7.

Figure 21:
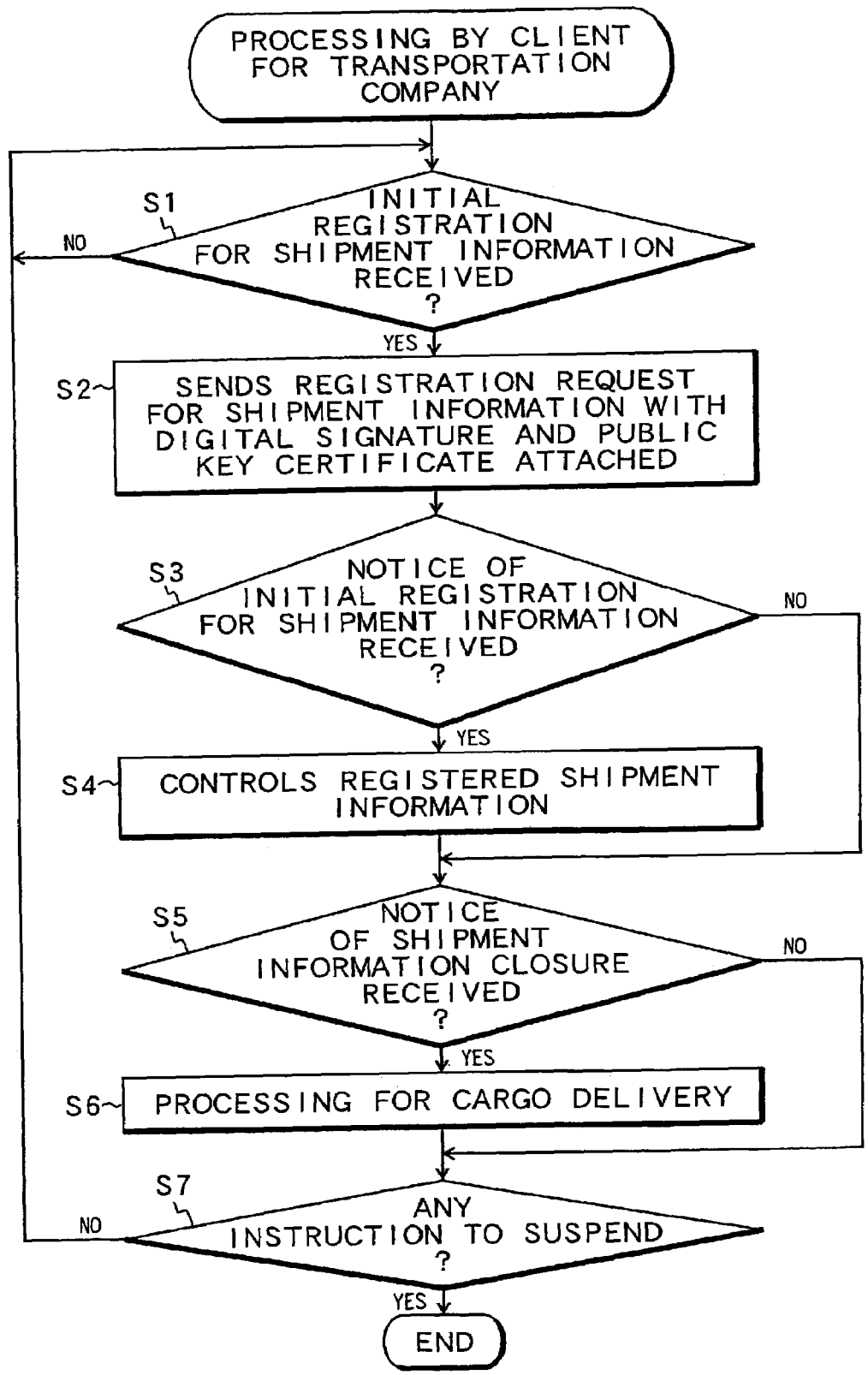
FIG. 21 is a flow chart of processing by client for transportation company of FIG. 3.

FIG. 21 is a flow chart of processing by client 18 for transportation company of FIG. 3. The client processing of the client 18 for transportation company is explained as follows; when the initial registration request of shipment information is distinguished in Step S1, the procedure moves to Step S2, and the registration request is transmitted to the electronic transaction server 10 with the digital signature and public key certificate attached. If there is the initial registration notice of shipment information is received from the electronic transaction server 10 in Step S3, the procedure is moved to Step S4 and registered shipment information begins to be controlled. In addition, in Step S5, if the closure notice of the registered shipment information is received from the electronic transaction server 10, electronic processing required for delivery of the cargo to the current cargo owner as a result of the closure notice is carried out. These kinds of processing described in Step S1 to Step S6 are repeated until the suspension instruction is given by log-off in Step S7.

Figure 22A:
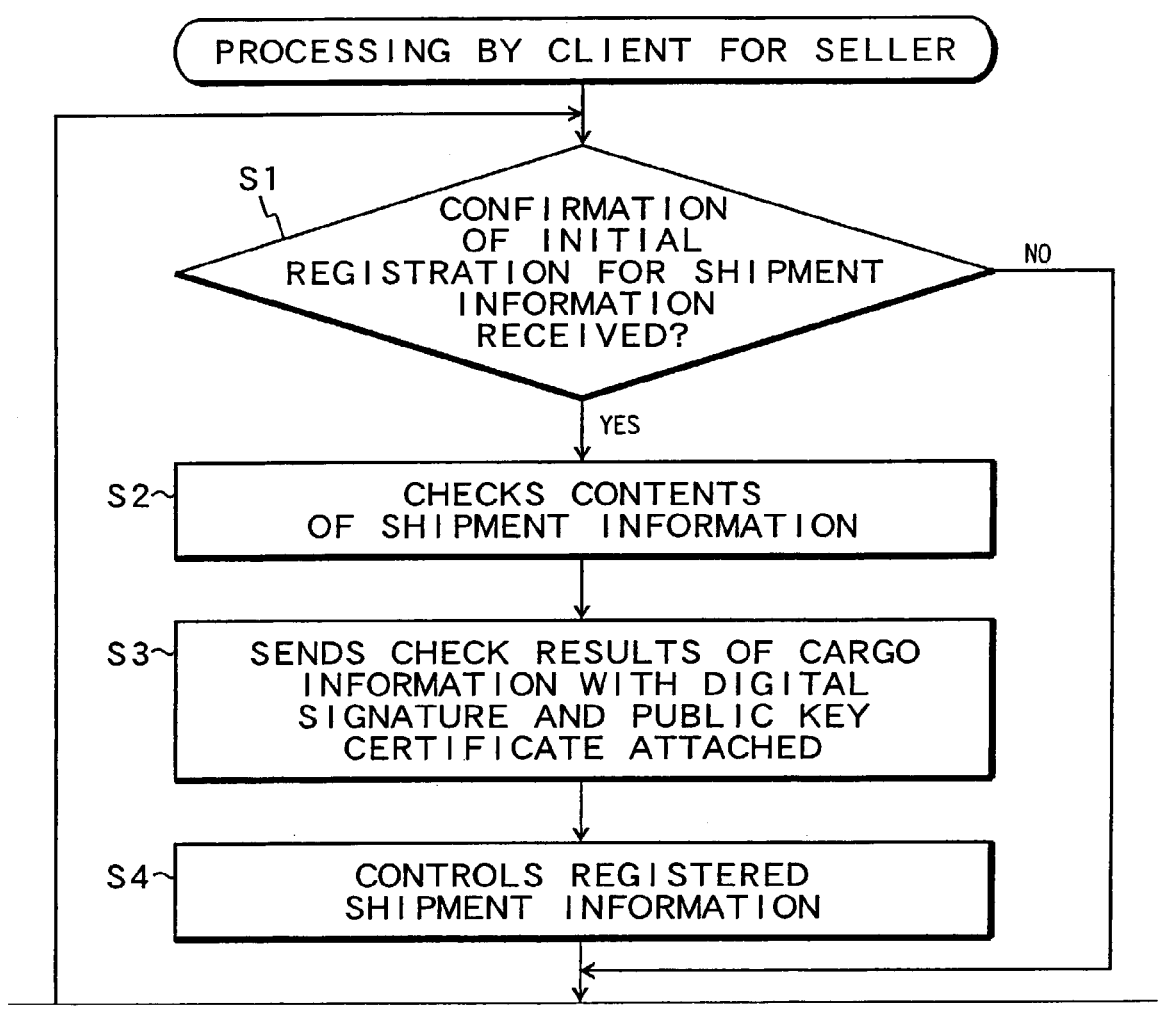
FIG. 22A, 22B are flow charts of processing by client for seller of FIG. 3.
Figure 22B:
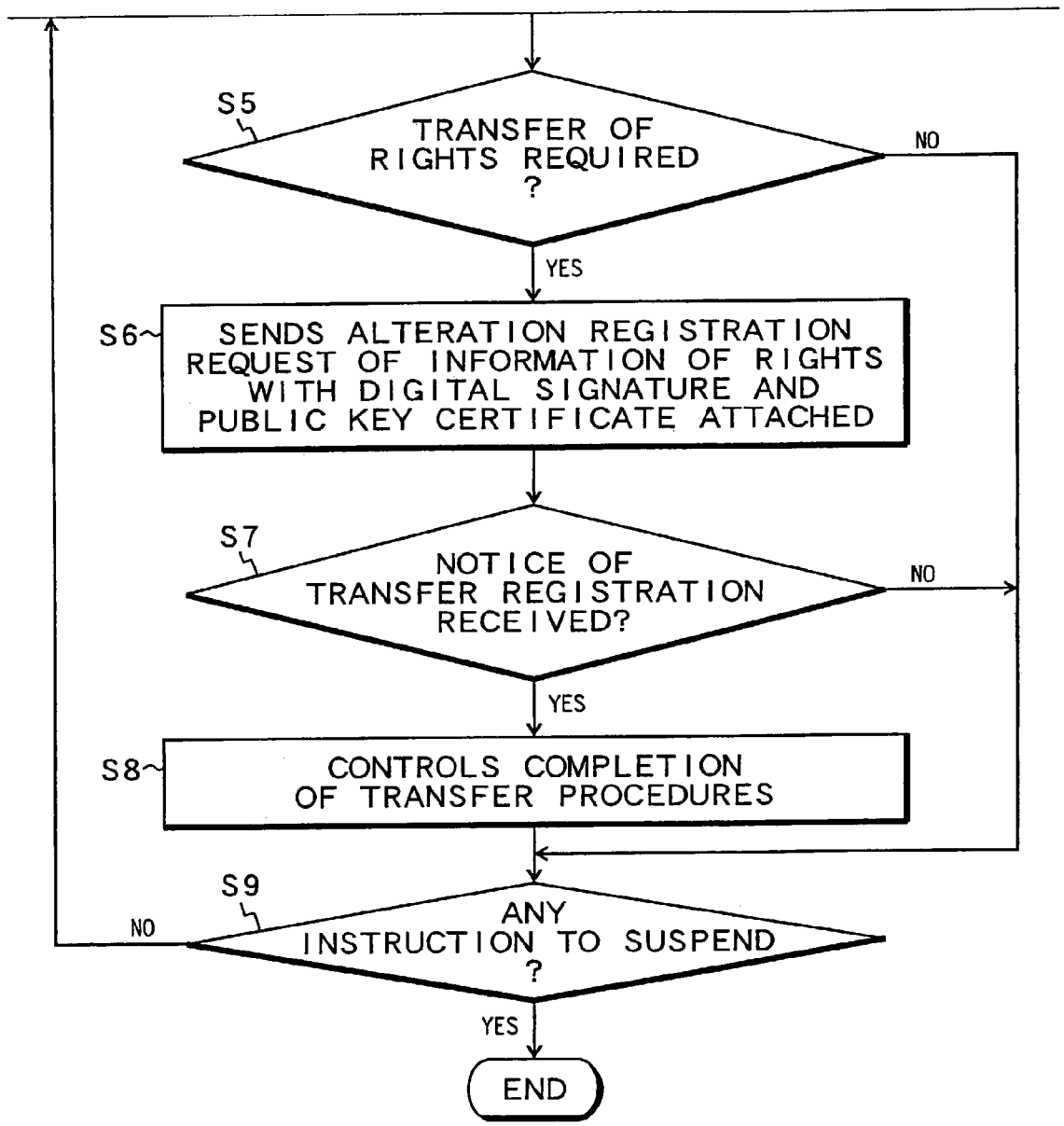

FIGS. 22A, 22B are flow charts of processing by client 14 for seller of FIG. 3. In processing of the client for buyer, when the initial registration check of shipment information is received in Step S1, the contents of the shipment information received are checked in Step S2, and after the check results for the shipment information are transmitted with the digital signature and public key certificate attached in Step S3 in accordance with the check results, the registered shipment information begins to be controlled in Step S4. If the request for passage of the title concerning the registered shipment information is give from the operator in Step S5, the alteration registration request of information of rights is transmitted to the electronic transaction server 10 with the digital signature and public key certificate attached in Step S6. And in Step S7, when the transfer registration notice is received from the electronic transaction server 10, the closing of transfer procedures begins to be controlled in Step S8. These kinds of processing from Step S1 to S8 are repeated until instruction to suspend such as log-off, etc. is received in Step S9.

Figure 23A:
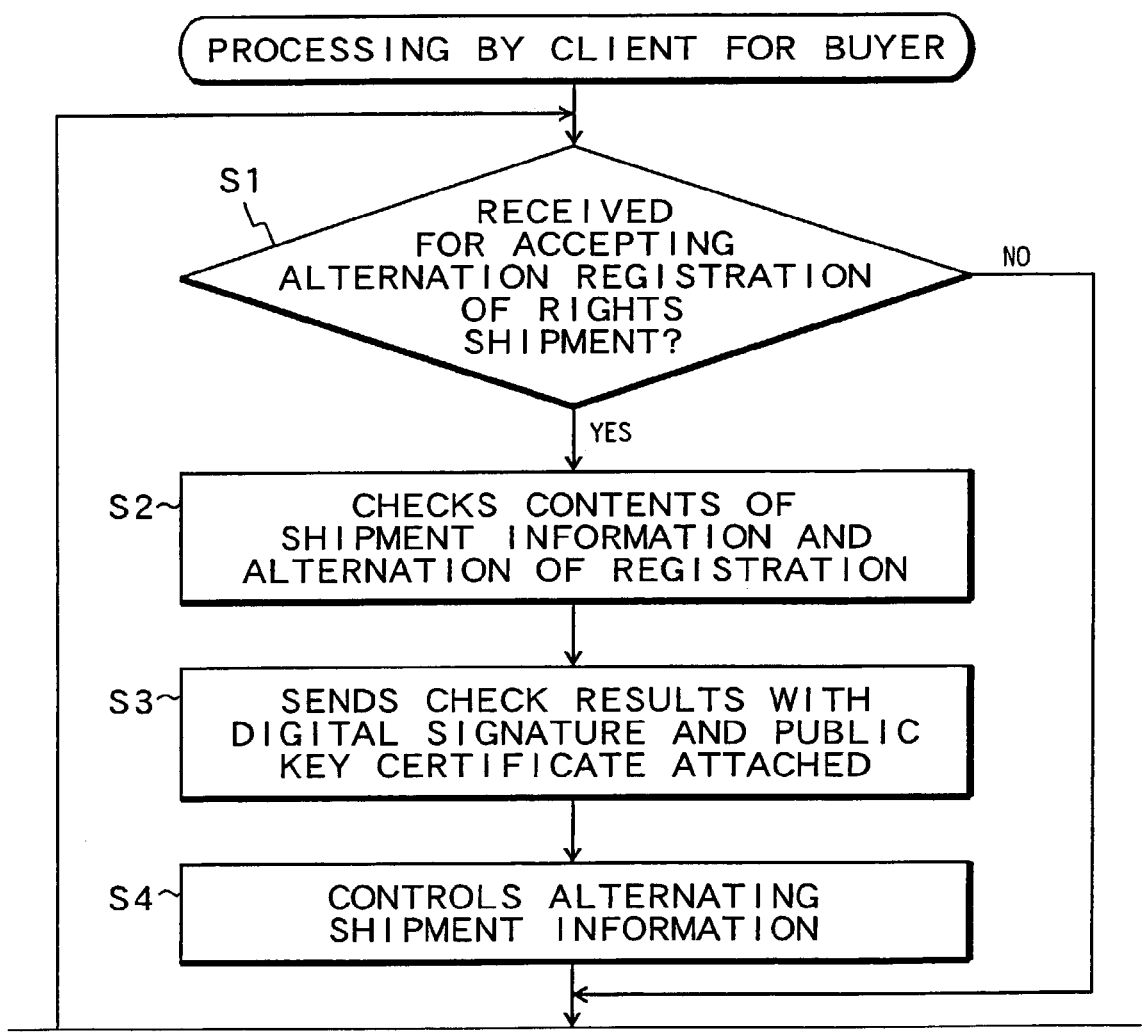
FIG. 23A, 23B are flow charts of processing by client for buyer of FIG. 3.
Figure 23B:
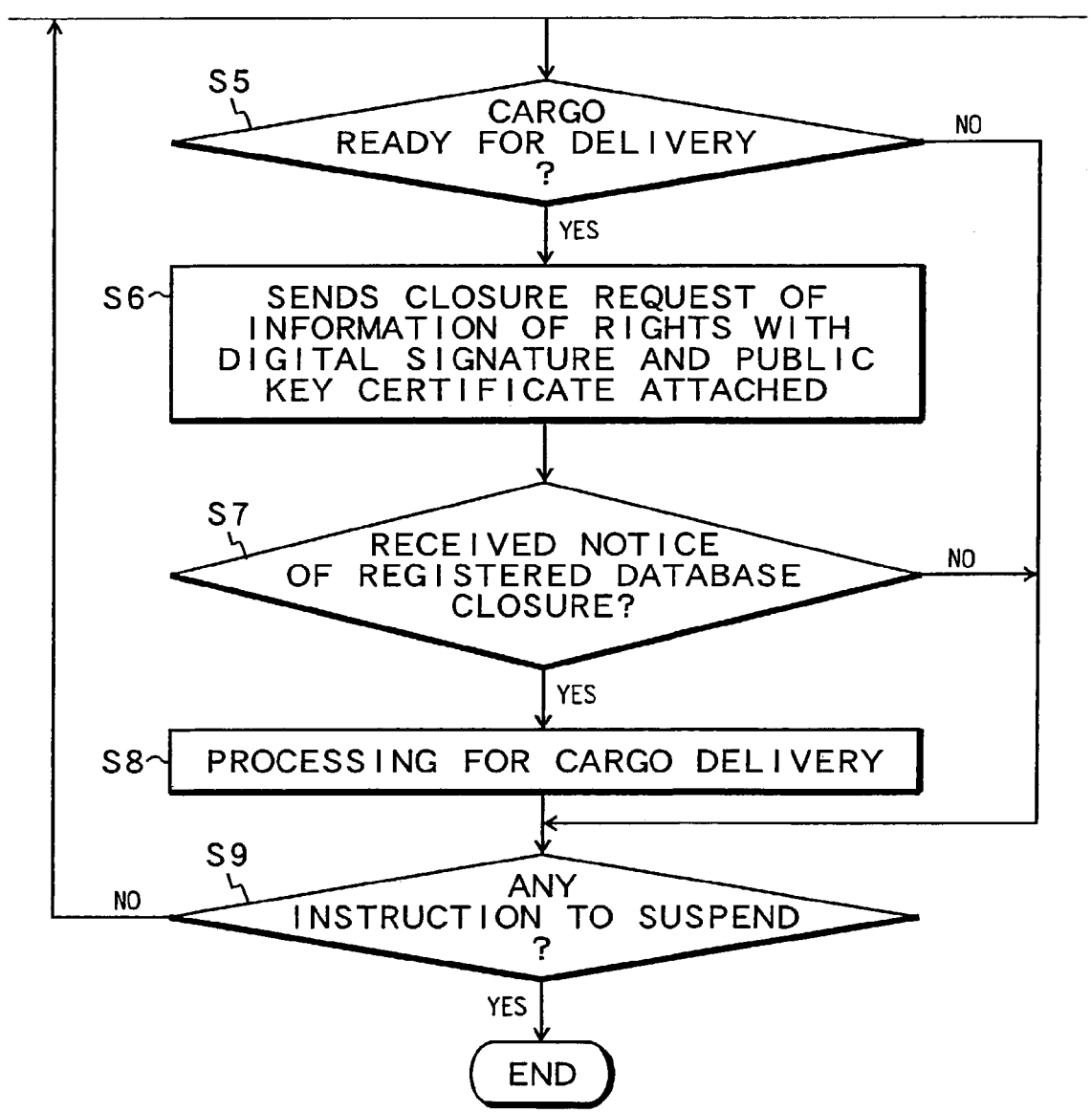

FIGS. 23A, 23B are flow charts of processing by client 16 for buyer. In this processing by client for buyer, when the request for accepting alternation registration of rights of shipment is received from the electronic transaction server 10 in Step S1, contents of shipment information and alteration of registration are checked in Step S2, the check results are transmitted to the electronic transaction server 10 with the digital signature and public key certificate attached in Step S3, and the check result of the correct contents are transmitted, the alternating shipment information begins to be controlled in Step S4. When the notice such as completion of delivery preparation, etc. of the cargo corresponding to the information on the cargo transferred to the buyer is received from the transportation company, etc. and is distinguished in Step S5, the processing moves to Step S6, and the request for closing the title information of the applicable cargo is transmitted to the electronic transaction server 10 with the digital signature and public key certificate attached. If the closure notice of the registration database is received from the electronic transaction server 10 together with the closure number in Step S7 to this request for closure, the processing moves to Step S8, where electronic processing required for cargo delivery is carried out. These kinds of processing from Steps S1 through S8 are repeated until any instruction to suspend such as log-off is received in Step S9.

Furthermore, the present invention provides a computer-readable storage medium that records the shipment information initial registration processing in FIG. 15 that shows the processing of FIG. 11 in detail, the title transfer registration processing in FIG. 18, and the electronic transaction program for executing the shipment information database closure processing for completing passage of title of FIG. 20. Examples of the storage medium that stores the electronic transaction program include removable portable type storage medium such as CD-ROM, floppy disk, etc., storage medium of the program provider who provides programs through circuits, and furthermore, memory device such as RAM, hard-disk of processors installed with programs. The electronic transaction program provided by these storage media is loaded on the electronic transaction server 10 of FIG. 3 and executed on their main memory.

Furthermore, the present information can provide a storage medium that stores the program for processing the client for transportation company of FIG. 21, a storage medium that stores the program for processing the client for seller of FIG. 22, and further a storage medium that stores the program for processing the client for buyer of FIG. 23, and each of the storage media is loaded to the relevant apparatus of client 18 for transportation company of FIG. 3, client 14 for seller, and client 16 for buyer, and executed on the main memory.

In addition, because in the actual electronic transaction system shown in FIG. 2, the negotiating bank system 20 and issuing bank system 24 participate in the transaction system as users who receive the services, and the negotiating bank system 20 and the issuing bank system 24 function as the buyer and the seller, both functions of client 14 for seller and the client 16 for buyer shown in FIG. 3 are equipped. In addition, since the seller and the buyer become conversely the buyer and the seller in accord with the transaction scenes, it is desirable to equip both processing functions of client 14 for seller and the client 16 for buyer shown in FIG. 4 as is the case of the bank system sides as relevant clients.

By the way, the above-mentioned embodiment is described with the electronic transaction taken as an example, but the present invention shall not be limited to this and the system same as the electronic transaction system according to the present invention can be applied exactly in the same manner where the transaction of products is carried out by the electronic signature utilizing the public key certificates issued by separate certificate authorities. In addition, the present invention shall not be limited to the above-mentioned embodiment and includes suitable modifications that would not impair its objects and advantages. Furthermore, the present invention shall not be limited by numerical values shown in the above-mentioned embodiment.

INDUSTRIAL APPLICABILITY

As described above, according to the present invention, as far as the parties utilizing the public key certificates in their actual transaction by this kind of electronic transaction server register their own public key certificate in the database of the electronic transaction services organization with security secured and the public key certificate is registered, the electronic signature can be verified, and as a result, electronic transaction can be safely carried out without premising the existence of Route CA and using the public key certificate whichever certificate organization issues.

In addition, according to the present invention, because the current bill of lading is not computerized and the title to the cargo is passed electronically and with legal effects associated, the transaction can be completely computerized and the title to the cargo can be passed form the seller to the buyer at a high speed and with safety, and by this computerization, the increased efficiency of transaction procedures can be achieved.

The invention claimed is:

1. An electronic international trade transaction server, comprising:
   a user registration processor unit that registers the user registration information to the database, which includes the public key certification acquired from the certification authority that has jurisdiction over each party by the request from the transaction party including seller as the exporter, buyer as the importer, and transportation company
   a transfer registration processor unit that changes the access right holder and the cargo owner of the shipment information registered to the database at the start of the international trade transaction in compliance with the request for request for changing registration of the party with the digital signature and public key certification attached, and
   a verification processor unit that achieves the transfer registration with legal binding power by verifying that the digital signature attached to the request for request for changing registration has been prepared by the private key which makes a pair with the public key certificate registered to the database and receiving the approval of the other party.

2. An electronic international trade transaction server comprising:
   a user registration processor unit that registers the user registration information to the database, which includes the public key certification acquired from the certification authority that has jurisdiction over each party by the request from the transaction party including seller as the exporter, buyer as the importer, and transportation company
   a transfer registration processor unit that changes the access right holder and the cargo owner of the shipment information registered to the database at the start of the international trade transaction in compliance with the request for request for changing registration of the party with the digital signature and public key certification attached, and
   a verification processor unit that achieves the transfer registration with legal binding power by verifying that the digital signature attached to the request for request for changing registration has been prepared by the private key which makes a pair with the public key certificate registered to the database and receiving the approval of the other party: and
   wherein the transfer registration processor unit initially registers the shipment information with the cargo owner designated as the seller to the database in accordance with the initial registration request from the client for transportation company with the digital signature and the public key certificate attached, the title to the cargo is requested for changing registration to the buyer in accordance with the request for changing registration from the client for seller with the digital signature and public key certificate attached, the registration of shipment information is closed in accordance with the closure request from the client for buyer with the digital signature and the public key certificate attached and the change of the cargo owner is prohibited, in this case, the verification processor unit verifies that the digital signature attached to each request has been prepared by the private key that makes a pair with the public key certificate registered to the database, and acquires the approval of the other party simultaneously, thereby achieving the transfer registration with legal binding force.

3. The electronic foreign trade transaction server recited in claim 2:
   wherein the user registration processor unit prepares the user registration information including the user ID of the transaction party, date of user registration, registration expiry date, public key certificate, and user information and registers to the database.

4. The electronic international trade transaction server recited in claim 2:
   wherein the user registration processor unit establishes and registers the invalidation information on the public key certificate to the user registration information on request from the transaction party, changes the closure-registration state, and prevents achievement of the transfer registration with legal binding force by the verification processor unit.

5. The electronic international trade transaction server recited in claim 2:

wherein the shipment information registered to the electronic foreign trade transaction server comprises the fixed information and updated information; the fixed information contains the shipment information ID, shipment information hash value, shipment information registration date and time, and shipment information, while the updated information contains the access right holder information, cargo owner information, information on rights appendant to cargo, and date and time of altered shipment information registration, and the request message from the transaction party has a message structure containing the transmitter ID, shipment information ID, instructions to the server, next right holder ID, shipment information, and digital signature.

6. The electronic international trade transaction server recited in claim 2:

wherein the user registration processor unit of the electronic transaction server further registers the user registration data of the intermediate parties such as banks, etc. which stand between the seller and the buyer, the transfer registration processor unit initially register the shipment information in accordance with the initial registration request with the digital signature and the public key certificate attached from the client for transportation company, changes the access right holder and the cargo owner to the intermediate party in compliance with the request for changing registration with the digital signature and public key certificate attached from the client for seller, and then, changes the access right holder and the cargo owner to other intermediate party or buyer in compliance with the request for changing registration with the digital signature and the public key certificate attached from the intermediate party, and lastly, closes the registration of shipment information and prohibits change of the title to the cargo in compliance with the closure request with the digital signature and the public key certificate attached from the client for buyer, and the verification processor unit verifies that the digital signature attached to the request has been prepared by the private key that makes a pair with the public key certificate registered to the database and acquires an approval of the other party, thereby establishing the transfer registration that has the legal binding force.

7. The electronic international trade transaction server recited in claim 6:

wherein the bank that serves as an intermediate party in the electronic transaction is a negotiating bank who has a banking agreement of export service with the seller, and/or an issuing bank who has a banking agreement of import service with the buyer.

8. The electronic international trade transaction server recited in claim 2:

wherein the transfer registration processor unit notifies the client for transportation company of closure of the database registration of shipment information and instructs to deliver the cargo to the present cargo owner when the registration of shipment information is closed and changes of the cargo owner are prohibited.

9. A client for transportation company for the electronic international trade transaction, comprising:

a user registration request unit for requesting the data registration of user registration information including the public key certificate acquired from the certificate authority that has jurisdiction over itself to the server, an initial registration request unit for transmitting the initial registration request to the electronic foreign trade transaction server with the digital signature and public key certificate attached to the shipment information and initially registering the shipment information to the database, and a cargo delivery processor unit for carrying out necessary procedures for delivering cargo to the present cargo owner when the notice of closure registration of cargo information registered to the database is received from the server.

10. A client for seller as exporter of electronic international trade transaction, comprising:

a user registration request unit for requesting the database registration of the user registration information including the public key certificate acquired from the certificate authority that has jurisdiction over itself to the server, an initial registration check request unit for checking the contents and responding the results when the request for checking the initial registration request of the shipment information is received from the server for the international trade transaction, and a transfer request unit for transmitting to the server the request for changing registration for changing the access right holder and cargo owner to buyer with the digital signature and the public key certificate attached, receiving the request for changing registration notice from the server, and recognizing the establishment of transfer registration with legal binding force.

11. A client for buyer for electronic international trade transaction, comprising:

a user registration request unit for requesting the database registration of user registration information including the public key certificate acquired from the certificate authority that has jurisdiction over itself to the server, a transfer check unit for checking the contents and responding the results when the check request is received from the server for requesting the request for changing registration to change the access right holder and the cargo owner to the buyer for the international trade transaction, and a registration closure request unit for transmitting to the server the closure request of shipment information of the database with the digital signature and public key certificate attached and carrying out necessary procedures for receiving the cargo delivered by the transportation company when the registration closure notice is received from the server.

12. An electronic international trade transaction method, comprising registering the user registration information including the public key certificate acquired from the certificate authority that has jurisdiction over each party to the server on the request of the transaction parties including the seller as the exporter, buyer as the importer, and transportation company;

changing the access right holder and cargo owner registered to the database at the start of international trade transaction to other party in compliance with the request for changing registration of the party with the digital signature and public key certificate attached; and achieving the transfer registration with legal binding force by verifying that the digital signature attached to each request has been prepared by the private key that makes a pair with the public key certificate registered to the database, and acquiring the approval of the other party simultaneously.

13. The electronic international trade transaction method recited in claim 12:

wherein the transfer registration with legal binding force is achieved by initially registering the shipment information to the database with the access right holder and the cargo owner designated as the seller in accordance with the initial registration request from the transportation company with the digital signature and the public key certificate attached, by changing the title to the cargo from the access right holder and the cargo owner to the buyer in accordance with the request for changing registration from the seller with the digital signature and public key certificate attached, by finally closing the registration of shipment information in accordance with the closure request from the buyer with the digital signature and the public key certificate attached to prohibit the change of the cargo owner, and by verifying that the digital signature attached to each request has been prepared by the private key that makes a pair with the public key certificate registered to the database and simultaneously by acquiring the approval of the other party.

14. The electronic international trade transaction method recited in claim 12:

wherein the user registration processor unit prepares the user registration information including the user ID of the transaction party, date of user registration, registration expiry date, public key certificate, and user information and registers to the database.

15. The electronic international trade transaction method recited in claim 12:

wherein the user registration processor unit establishes and registers the invalidation information on the public key certificate to the user registration information on request from the transaction party, changes the closure-registration state, and prevents achievement of the transfer registration with legal binding force by the verification processor unit.

16. The electronic international trade transaction method recited in claim 12:

wherein the shipment information registered to the electronic foreign trade transaction server comprises the fixed information and updated information; the fixed information contains the shipment information ID, shipment information hash value, shipment information registration date and time, and shipment information, while the updated information contains the access right holder information, cargo owner information, information on rights appendant to cargo, and date and time of altered shipment information registration, and the request message from the transaction party has a message structure containing the transmitter ID, shipment information ID, instructions to the server, next right holder ID, shipment information, and digital signature.

17. The electronic international trade transaction method recited in claim 12:

wherein the database, the user registration data of the intermediate parties such as banks, etc. which stand between the seller and the buyer are registered, the shipment information is initially registered in accordance with the initial registration request with the digital signature and the public key certificate attached from the client for transportation company, the access right holder and the cargo owner are changed to the intermediate party in compliance with the request for changing registration with the digital signature and public key certificate attached from the client for seller, and then, the access right holder and the cargo owner are changed to other intermediate party or buyer in compliance with the request for changing registration with the digital signature and the public key certificate attached from the intermediate party, and the registration of shipment information is closed and change of the title to the cargo is prohibited in compliance with the closure request with the digital signature and the public key certificate attached from the client for buyer, and it is verified that the digital signature attached to the request has been prepared by the private key that makes a pair with the public key certificate registered to the database and an approval of the other party is acquired to establish the transfer registration that has the legal binding force.

18. The electronic international trade transaction method recited in claim 17:

wherein the bank that serves as an intermediate party in the electronic transaction is a negotiating bank who has a banking agreement of export service with the seller, and/or an issuing bank who has a banking agreement of import service with the buyer.

19. The electronic international trade transaction method recited in claim 12:

wherein the client for transportation company is notified of closure of the database registration of shipment information and delivery of the cargo to the present cargo owner is instructed when the registration of shipment information is closed and changes of the cargo owner are prohibited.

20. A computer-readable memory medium storing the electronic transaction program, the said electronic international trade transaction program, comprising:

a user registration operation registering the user registration information including the public key certificate acquired from the certificate authority that has jurisdiction over each party to the database on the request of the transaction parties including the seller, buyer, and transportation company;

a request for changing registration operation changing the access right holder and cargo owner registered to the database at the start of the international trade transaction to other party in compliance with the request for changing registration of the party with the digital signature and public key certificate attached; and a verification operation achieving the transfer registration with legal binding force by verifying that the digital signature attached to each request has been prepared by the private key that makes a pair with the public key certificate registered to the database, and acquiring the approval of the other party simultaneously.

21. The memory medium recited in claim 20:

comprising a transfer registration operation registering the user registration information including the public key certificate acquired from the certificate authority that has jurisdiction over each party to the database on the request of the transaction parties including the seller as the exporter, buyer as the importer, and transportation company;

initially registering the shipment information with the seller designated as cargo owner in compliance with the request from the transportation company for initial registration with the digital signature and the public key certificate attached, a step for changing the access right holder and cargo owner registered to the database to the buyer in compliance with the request from the seller for changing registration with the digital signature and public key certificate attached; and closing the registration of shipment information and prohibiting change of the cargo owner in compliance with the request of closure from the buyer with the digital signature and the public key certificate attached;

wherein a verification step verifies that the digital signature attached to each request has been prepared by the private key that makes a pair with the public key certificate registered to the database, and acquiring the approval of the other party simultaneously so that the transfer registration with legal binding force can be established.

* * * * *

UNITED STATES PATENT AND TRADEMARK OFFICE
CERTIFICATE OF CORRECTION

| | | |
|---|---|---|
| PATENT NO. | : 7,069,252 B2 | Page 1 of 1 |
| APPLICATION NO. | : 10/337419 | |
| DATED | : June 27, 2006 | |
| INVENTOR(S) | : Munehiko Ishimi et al. | |

It is certified that error appears in the above-identified patent and that said Letters Patent is hereby corrected as shown below:

Column 20, Line 34, change "party:" to --party;--.

Signed and Sealed this

Thirty-first Day of October, 2006

JON W. DUDAS
*Director of the United States Patent and Trademark Office*